United States Patent
Dimnaku et al.

(10) Patent No.: US 10,048,896 B2
(45) Date of Patent: Aug. 14, 2018

(54) METHODS AND SYSTEMS FOR DETERMINING PERFORMANCE CAPACITY OF A RESOURCE OF A NETWORKED STORAGE ENVIRONMENT

(71) Applicant: NETAPP, INC., Sunnyvale, CA (US)

(72) Inventors: Alma Dimnaku, Wellesley, MA (US); Jeffrey Scott MacFarland, Wake Forest, NC (US); John Philip Larson, Jr., Chapel Hill, NC (US); Brian Kevin Mah, Cary, NC (US); Nareshkumar Maganlal Patel, San Jose, CA (US)

(73) Assignee: NETAPP, INC., Sunnyvale, CA (US)

( * ) Notice: Subject to any disclaimer, the term of this patent is extended or adjusted under 35 U.S.C. 154(b) by 108 days.

(21) Appl. No.: 15/071,917

(22) Filed: Mar. 16, 2016

(65) Prior Publication Data
US 2017/0269854 A1 Sep. 21, 2017

(51) Int. Cl.
*G06F 15/173* (2006.01)
*G06F 3/06* (2006.01)

(52) U.S. Cl.
CPC ............ *G06F 3/067* (2013.01); *G06F 3/061* (2013.01); *G06F 3/065* (2013.01); *G06F 3/0613* (2013.01); *G06F 3/0619* (2013.01); *G06F 3/0631* (2013.01); *G06F 3/0653* (2013.01)

(58) Field of Classification Search
CPC ...... G06F 3/0613; G06F 3/0619; G06F 3/065; G06F 3/067
USPC .................................. 709/217–219, 223–228
See application file for complete search history.

(56) References Cited

U.S. PATENT DOCUMENTS

| | | | |
|---|---|---|---|
| 6,192,470 B1 | 2/2001 | Kelley et al. | |
| 6,263,382 B1 | 7/2001 | Bartlett et al. | |
| 7,613,947 B1 | 11/2009 | Coatney et al. | |
| 7,664,798 B2 * | 2/2010 | Wood | G06F 17/30289 709/223 |
| 7,707,015 B2 | 4/2010 | Lubrecht et al. | |
| 8,010,337 B2 | 8/2011 | Narayanan et al. | |
| 8,244,868 B2 * | 8/2012 | La Frese | G06F 9/505 709/224 |

(Continued)

OTHER PUBLICATIONS

Final Office Action on related U.S. Appl. No. 14/805,770 dated Jun. 14, 2017.

(Continued)

*Primary Examiner* — Bharat N Barot
(74) *Attorney, Agent, or Firm* — Klein, O'Neill & Singh, LLP

(57) ABSTRACT

Methods and systems for a networked storage system are provided. One method includes categorizing by a processor performance data associated with a resource used in a networked storage environment for reading and writing data at a storage device based on a workload mix, where the workload mix is determined by a service time in which the resource processes the workload mix, a parameter indicating variability of the service time and a utilization bin index value indicating resource utilization at a given time; and determining by the processor available performance capacity of the resource using the categorized performance data, where the available performance capacity is based on optimum utilization of the resource and utilization of the resource.

20 Claims, 17 Drawing Sheets

(56) References Cited

U.S. PATENT DOCUMENTS

| | | |
|---|---|---|
| 8,260,622 B2 | 9/2012 | Chron et al. |
| 8,274,909 B2 | 9/2012 | Harvell et al. |
| 8,412,672 B1 | 4/2013 | Radhakrishnan et al. |
| 8,531,954 B2 | 9/2013 | McNaughton et al. |
| 8,738,972 B1 | 5/2014 | Bakman et al. |
| 8,874,954 B1 | 10/2014 | Gupte et al. |
| 9,009,296 B1 | 4/2015 | Siganporia et al. |
| 9,063,939 B2 | 6/2015 | Dalton |
| 9,128,965 B1 | 9/2015 | Yanacek et al. |
| 9,444,711 B1 | 9/2016 | Siganporia et al. |
| 9,645,901 B2 | 5/2017 | Nagaraj et al. |
| 9,830,238 B2 | 11/2017 | Mu et al. |
| 2002/0049845 A1 | 4/2002 | Sreenivasan et al. |
| 2002/0152305 A1 | 10/2002 | Jackson et al. |
| 2006/0074970 A1 | 4/2006 | Narayanan et al. |
| 2006/0161883 A1 | 7/2006 | Lubrecht et al. |
| 2006/0168272 A1 | 7/2006 | Rustad et al. |
| 2007/0283016 A1 | 12/2007 | Pendarakis et al. |
| 2008/0059972 A1 | 3/2008 | Ding et al. |
| 2010/0075751 A1 | 3/2010 | Garvey et al. |
| 2010/0232288 A1 | 9/2010 | Coatney et al. |
| 2010/0262710 A1 | 10/2010 | Khatib et al. |
| 2010/0313203 A1 | 12/2010 | Dawson et al. |
| 2011/0197027 A1 | 8/2011 | Balasubramanian et al. |
| 2011/0225362 A1 | 9/2011 | Leggette |
| 2012/0011517 A1 | 1/2012 | Smith et al. |
| 2012/0084270 A1 | 4/2012 | Jayaraman et al. |
| 2012/0137002 A1 | 5/2012 | Ferris et al. |
| 2013/0124714 A1 | 5/2013 | Bednar |
| 2013/0159548 A1 | 6/2013 | Vasseur et al. |
| 2013/0173804 A1 | 7/2013 | Murthy et al. |
| 2013/0204960 A1 | 8/2013 | Ashok et al. |
| 2013/0227111 A1 | 8/2013 | Wright et al. |
| 2013/0304903 A1* | 11/2013 | Mick .............. H04L 43/0817 709/224 |
| 2014/0068053 A1 | 3/2014 | Ravi et al. |
| 2014/0095696 A1* | 4/2014 | Sala .............. G06F 11/3409 709/224 |
| 2014/0165060 A1 | 6/2014 | Muller et al. |
| 2014/0372607 A1 | 12/2014 | Gladwin et al. |
| 2015/0006733 A1 | 1/2015 | Khan et al. |
| 2015/0095892 A1 | 4/2015 | Baggott et al. |
| 2015/0235308 A1 | 8/2015 | Mick et al. |
| 2015/0295827 A1 | 10/2015 | Zhu et al. |
| 2016/0065492 A1 | 3/2016 | Hu et al. |
| 2016/0112275 A1 | 4/2016 | Park et al. |
| 2016/0173571 A1 | 6/2016 | Bragstad et al. |
| 2017/0201580 A1* | 7/2017 | Dimnaku ............... G06F 3/067 |

OTHER PUBLICATIONS

Final Office Action on co-pending U.S. Appl. No. 14/805,804 dated Oct. 6, 2017.
Non-Final Office Action on co-pending U.S. Appl. No. 14/994,009 dated Nov. 21, 2017.
Notice of Allowance on related U.S. Appl. No. 14/805,851 dated Aug. 31, 2016.
Office Action on related U.S. Appl. No. 14/805,829 dated Nov. 8, 2016.
Notice of Allowance on related U.S. Appl. No. 14/805,829 dated Jan. 4, 2017.
Office Action on co-pending U.S. Appl. No. 14/805,770 dated Jan. 23, 2017.
Non-Final Office Action on co-pending U.S. Appl. No. 14/805,804 dated May 5, 2017.
Non-Final Office Action on co-pending U.S. Appl. No. 15/090,878 dated Dec. 22, 2017.
Notice of Allowance on co-pending U.S. Appl. No. 14/805,804 dated Jan. 19, 2018.
Non-Final Office Action on co-pending U.S. Appl. No. 15/098,007 dated Apr. 12, 2018.
Non-Final Office Action on co-pending U.S. Appl. No. 15/141,357 dated Dec. 15, 2017.
Non-Final Office Action on co-pending U.S. Appl. No. 14/805,770 dated Dec. 20, 2017.
Final Office Action on co-pending U.S. Appl. No. 15/090,878, dated May 18, 2018.
Notice of Allowance on co-pending U.S. Appl. No. 15/141,357, dated May 29, 2018.
Final Office Action on co-pending U.S. Appl. No. 14/994,009, dated Jun. 8, 2018.

* cited by examiner

METHODS AND SYSTEMS FOR DETERMINING PERFORMANCE CAPACITY OF A RESOURCE OF A NETWORKED STORAGE ENVIRONMENT

TECHNICAL FIELD

The present disclosure relates to managing resources in a networked storage environment.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple clients with access to shared data, backing up data and others.

A storage system typically includes at least a computing system executing a storage operating system for storing and retrieving data on behalf of one or more client computing systems (may just be referred to as "client" or "clients"). The storage operating system stores and manages shared data containers in a set of mass storage devices.

Quality of Service (QOS) is a metric used in a storage environment to provide certain throughput for processing input/output (I/O) requests for reading or writing data, a response time goal within, which I/O requests are processed and a number of I/O requests processed within a given time (for example, in a second (IOPS). Throughput means amount of data transferred within a given time, for example, in megabytes per second (Mb/s).

To process an I/O request to read and/or write data, various resources are used within a storage system, for example, processors at storage system nodes, storage devices and others. The different resources perform various functions in processing the I/O requests and have finite performance capacity to process requests. As storage systems continue to expand in size, complexity and operating speeds, it is desirable to efficiently monitor and manage resource usage and know what performance capacity of a resource may be available at any given time. Continuous efforts are being made to better manage resources of networked storage environments.

BRIEF DESCRIPTION OF THE DRAWINGS

The various features of the present disclosure will now be described with reference to the drawings of the various aspects. In the drawings, the same components may have the same reference numerals. The illustrated aspects are intended to illustrate, but not to limit the present disclosure. The drawings include the following Figures.

DETAILED DESCRIPTION

Figure 1A:
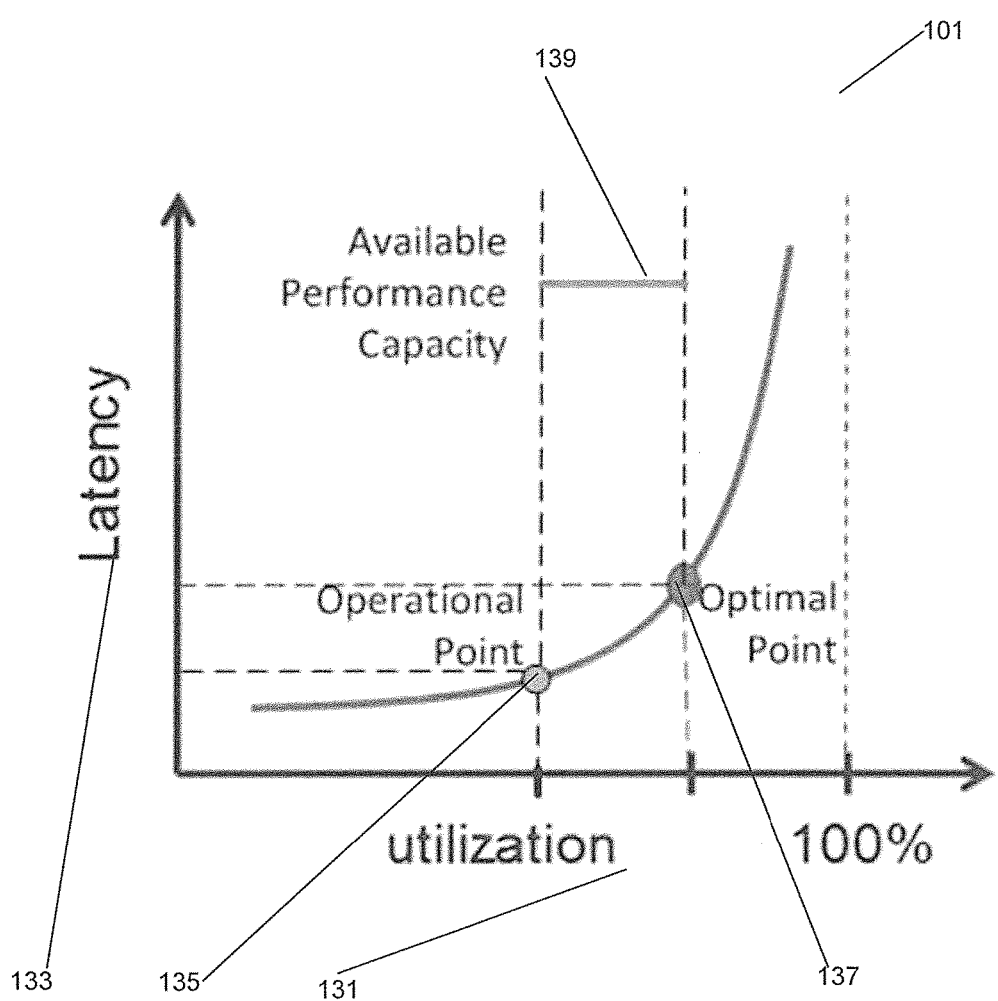
FIG. 1A shows an example of a relationship between latency v. utilization curve (LvU) for determining performance capacity, according to one aspect of the present disclosure.

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, quality of service (QOS) data (or performance data) is collected for various resources by a headroom module interfacing with a storage operating system of a storage server. QOS provides a certain throughput (i.e. amount of data that is transferred within a given time interval (for example, megabytes per seconds (MBS)), latency and/or a number of input/output operations that can be processed within a time interval, for example, in a second (referred to as IOPS). Latency means a delay in completing the processing of an I/O request and may be measured using different metrics for example, a response time in processing I/O requests. Based on the collected data, the methods and systems described herein determine available performance capacity of a resource.

Latency v Utilization Curve:

In one aspect, methods and systems for efficiently using resources in a networked storage environment is provided. The resources may be used based on remaining (or useful) performance capacity at any given time that is available for a resource relative to a peak/optimal performance capacity without violating any performance expectations. The available performance capacity may be referred to as "headroom" that is discussed in detail below. The term resource includes any resource in the networked storage environment, including processing nodes, aggregates with more than one storage devices and others that are described below in detail. Peak performance capacity of a resource may be determined according to performance limits that may be set by policies (for example, QoS or service level objectives (SLOs) as described below).

In one aspect, the remaining or available performance capacity is determined from a relationship between latency and utilization of a resource. FIG. 1A shows an example of one such curve. Latency 133 for a given resource that is used to process workloads is shown on the vertical, Y-axis, while the utilization 131 of the resource is shown on the X-axis.

The LvU curve shows an optimal point 137, after which latency shows a rapid increase. Optimal point represents maximum (or optimum) utilization of a resource beyond which an increase in workload are associated with higher throughput gains than latency increase. Beyond the optimal point, if the workload increases at a resource, the throughput gains or utilization increase is smaller than the increase in latency. An optimal point may be determined by a plurality of techniques defined below. The optimal point may also be customized based on a service level that guarantees certain latency/utilization for a user. The use of optimal points are described below in detail.

An operational point 135 shows current utilization of the resource. The available performance capacity is shown as 139. In one aspect, the operational point may also be determined based on the effect of internal workloads (for example, when a storage volume is moved), when a storage node is configured as a high availability failover node or when there are workloads that can be throttled or delayed because they may not be very critical.

In one aspect, headroom (or available performance capacity) may be based on the following relationship:

$$\text{Headroom} = \frac{\text{Optimal Point} - \text{Operational Point}}{\text{Optimal Point}}$$

Headroom may be based on current utilization and a current optimal point that is ascertained based on collected and observed data. This is referred to "sampled" headroom. The sampled headroom may be modified by updating the current utilization of the resource to reflect any high availability node pair load (defined below) or any work that can be throttled or defined as not being critical to a workload mix. The term workload mix represents user workloads at a resource. Details of determining headroom are provided below.

In one aspect, methods and systems for a networked storage system are provided. One method includes categorizing by a processor performance data associated with a resource used in a networked storage environment for reading and writing data at a storage device based on a workload mix, where the workload mix is determined by a service time in which the resource processes the workload mix, a parameter indicating variability of the service time and a utilization bin index value indicating resource utilization at a given time; and determining by the processor available performance capacity of the resource using the categorized performance data, where the available performance capacity is based on optimum utilization of the resource and utilization of the resource.

Before describing the processes for generating the relationship between latency v utilization (may also be referred to as LvU), the following provides a description of the overall networked storage environment and the resources used in the operating environment for storing and managing data.

Figure 1B:
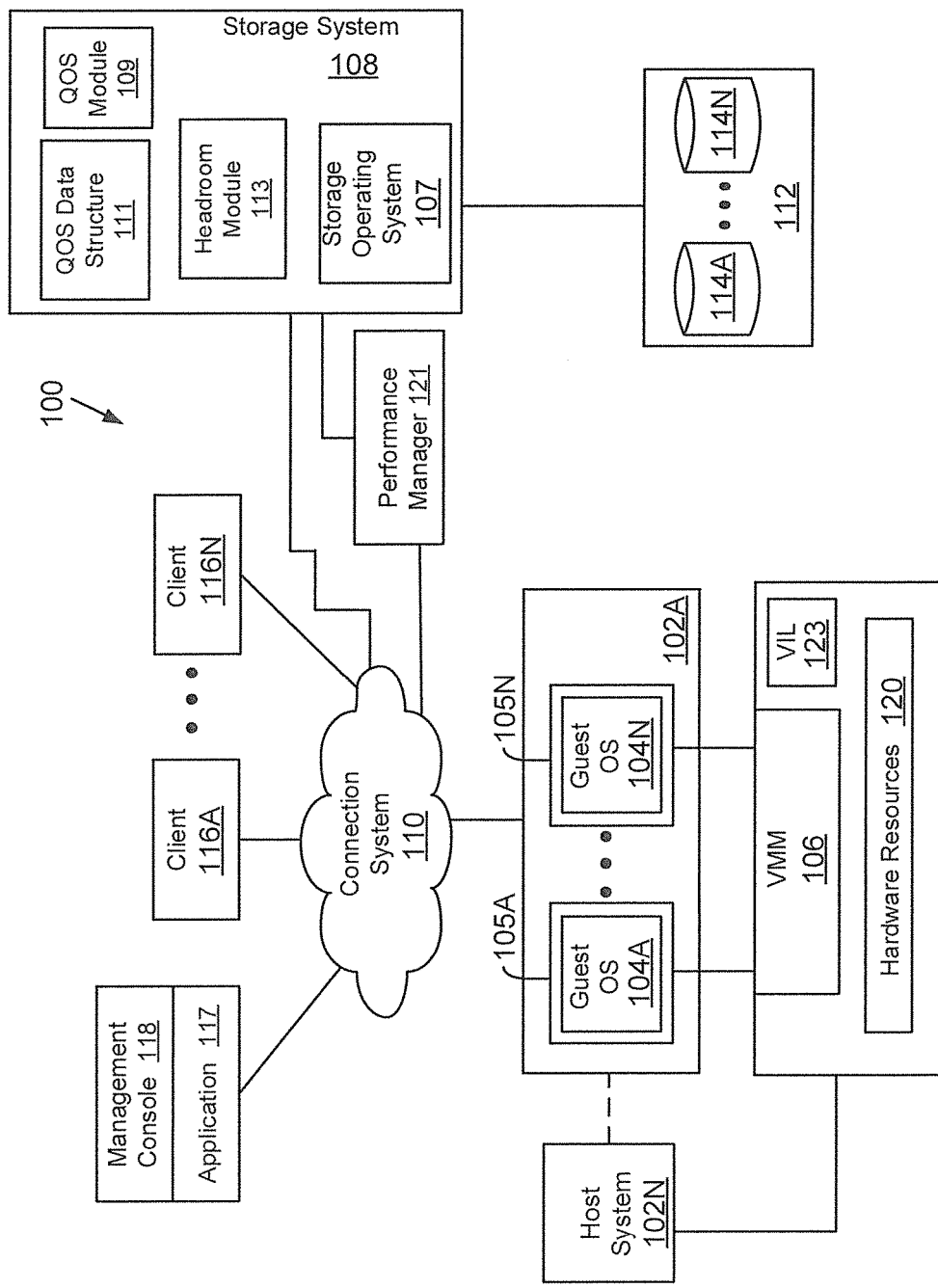
FIG. 1B shows an example of an operating environment for the various aspects disclosed herein.

System 100:

FIG. 1B shows an example of a system 100, with a storage system (may also be referred to as a storage server) 108, where the various adaptive aspects disclosed herein may be implemented. The storage system 108 executes a storage operating system 107 and a headroom module 113 that monitors real-time resource performance and utilization and determines available performance capacity for a resource. This enables storage system 108 to allocate resources based on available capacity, as described below in detail.

In one aspect, storage system 108 has access to a set of mass storage devices 114A-114N (may be referred to as storage devices 114 or as storage device 114) within at least one storage subsystem 112. The storage devices 114 may include writable storage device media such as magnetic disks, video tape, optical, DVD, magnetic tape, non-volatile memory devices for example, solid state drives (SSDs) including self-encrypting drives, flash memory devices and any other similar media adapted to store information. The storage devices 114 may be organized as one or more groups of Redundant Array of Independent (or Inexpensive) Disks (RAID). The aspects disclosed are not limited to any particular storage device type or storage device configuration.

In one aspect, the storage system 108 provides a set of logical storage volumes (may be interchangeably referred to as volume or storage volume) for providing physical storage space to host systems 102A-102N (or virtual machines (VMs) 105A-105N). A storage volume is a logical storage object and typically includes a file system in a NAS environment or a logical unit number (LUN) in a SAN environment. The various aspects described herein are not limited to any specific format in which physical storage is presented as logical storage (volume, LUNs and others)

Each storage volume may be configured to store data files (or data containers or data objects), scripts, word processing documents, executable programs, and any other type of structured or unstructured data. From the perspective of one of the client systems, each storage volume can appear to be a single drive. However, each storage volume can represent storage space in at one storage device, an aggregate of some or all of the storage space in multiple storage devices, a RAID group, or any other suitable set of storage space.

A storage volume is identified by a unique identifier (Volume-ID) and is allocated certain storage space during a configuration process. When the storage volume is created, a QOS policy may be associated with the storage volume such that requests associated with the storage volume can be managed appropriately. The QOS policy may be a part of a QOS policy group (referred to as "Policy_Group") that is used to manage QOS for several different storage volumes as a single unit. The QOS policy information may be stored at a QOS data structure 111 maintained by a QOS module 109. QOS at the storage system level may be implemented by the QOS module 109. QOS module 109 maintains various QOS data types that are monitored by the headroom module 113, as described below in detail.

The storage operating system 107 organizes physical storage space at storage devices 114 as one or more "aggregate", where each aggregate is a logical grouping of physical storage identified by a unique identifier and a location. The aggregate includes a certain amount of storage space that can be expanded. Within each aggregate, one or more storage volumes are created whose size can be varied. A qtree, sub-volume unit may also be created within the storage volumes. For QOS management, each aggregate and the storage devices within the aggregates are considered as resources that are used by storage volumes.

The storage system 108 may be used to store and manage information at storage devices 114 based on an I/O (input/output) request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

In a typical mode of operation, a client system (for example, 116A-116N, host systems 102A-102N or a VM) transmits one or more I/O request, such as a CFS or NFS read or write request, over a connection system 110 to the storage system 108. Storage operating system 107 receives the request, issues one or more I/O commands to storage devices 114 to read or write the data on behalf of the client system, and issues a CIFS or NFS response containing the requested data over the network 110 to the respective client system.

System 100 may also include a virtual machine environment where a physical resource is time-shared among a plurality of independently operating processor executable VMs. Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform or host system) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

In one aspect, system 100 may include a plurality of computing systems 102A-102N (may also be referred to individually as host platform/system 102 or simply as server 102) communicably coupled to the storage system 108 via the connection system 110 such as a local area network (LAN), wide area network (WAN), the Internet or any other interconnect type. As described herein, the term "communicably coupled" may refer to a direct connection, a network connection, a wireless connection or other connections to enable communication between devices.

Host system 102A includes a processor executable virtual machine environment having a plurality of VMs 105A-105N that may be presented to client computing devices/systems 116A-116N. VMs 105A-105N execute a plurality of guest OS 104A-104N (may also be referred to as guest OS 104) that share hardware resources 120. As described above, hardware resources 120 may include processors, memory, I/O devices, storage or any other hardware resource.

In one aspect, host system 102 interfaces with a virtual machine monitor (VMM) 106, for example, a processor executed Hyper-V layer provided by Microsoft Corporation of Redmond, Wash., a hypervisor layer provided by VMWare Inc., or any other type. VMM 106 presents and manages the plurality of guest OS 104A-104N executed by the host system 102. The VMM 106 may include or interface with a virtualization layer (VIL) 123 that provides one or more virtualized hardware resource to each OS 104A-104N.

In one aspect, VMM 106 is executed by host system 102A with VMs 105A-105N. In another aspect, VMM 106 may be executed by an independent stand-alone computing system, often referred to as a hypervisor server or VMM server and VMs 105A-105N are presented at one or more computing systems.

It is noteworthy that different vendors provide different virtualization environments, for example, VMware Corporation, Microsoft Corporation and others. The generic virtualization environment described above with respect to FIG. 1B may be customized to implement the aspects of the present disclosure. Furthermore, VMM 106 (or VIL 123) may execute other modules, for example, a storage driver, network interface and others, the details of which are not germane to the aspects described herein and hence have not been described in detail.

System 100 may also include a management console 118 that executes a processor executable management application 117 for managing and configuring various elements of system 100. Application 117 may be used to manage and configure VMs and clients as well as configure resources that are used by VMs/clients, according to one aspect. It is noteworthy that although a single management console 118 is shown in FIG. 1B, system 100 may include other management consoles performing certain functions, for example, managing storage systems, managing network connections and other functions described below.

In one aspect, application 117 may be used to present storage space that is managed by storage system 108 to clients' 116A-116N (or VMs). The clients may be grouped into different service levels (also referred to as service level objectives or "SLOs"), where a client with a higher service level may be provided with more storage space than a client with a lower service level. A client at a higher level may also be provided with a certain QOS vis-à-vis a client at a lower level.

System 100 also includes a performance manager 121 that interfaces with storage system 108 for receiving QOS data.

The performance manager 121 is an off-box solution i.e. outside of storage system 108 for monitoring performance data. The performance manager 121 may be a processor executable module that is executed by one or more processors out of a memory device. The performance manager 121 obtains the QOS data, analyzes the data and stores and provides performance information to users.

Figure 2A:
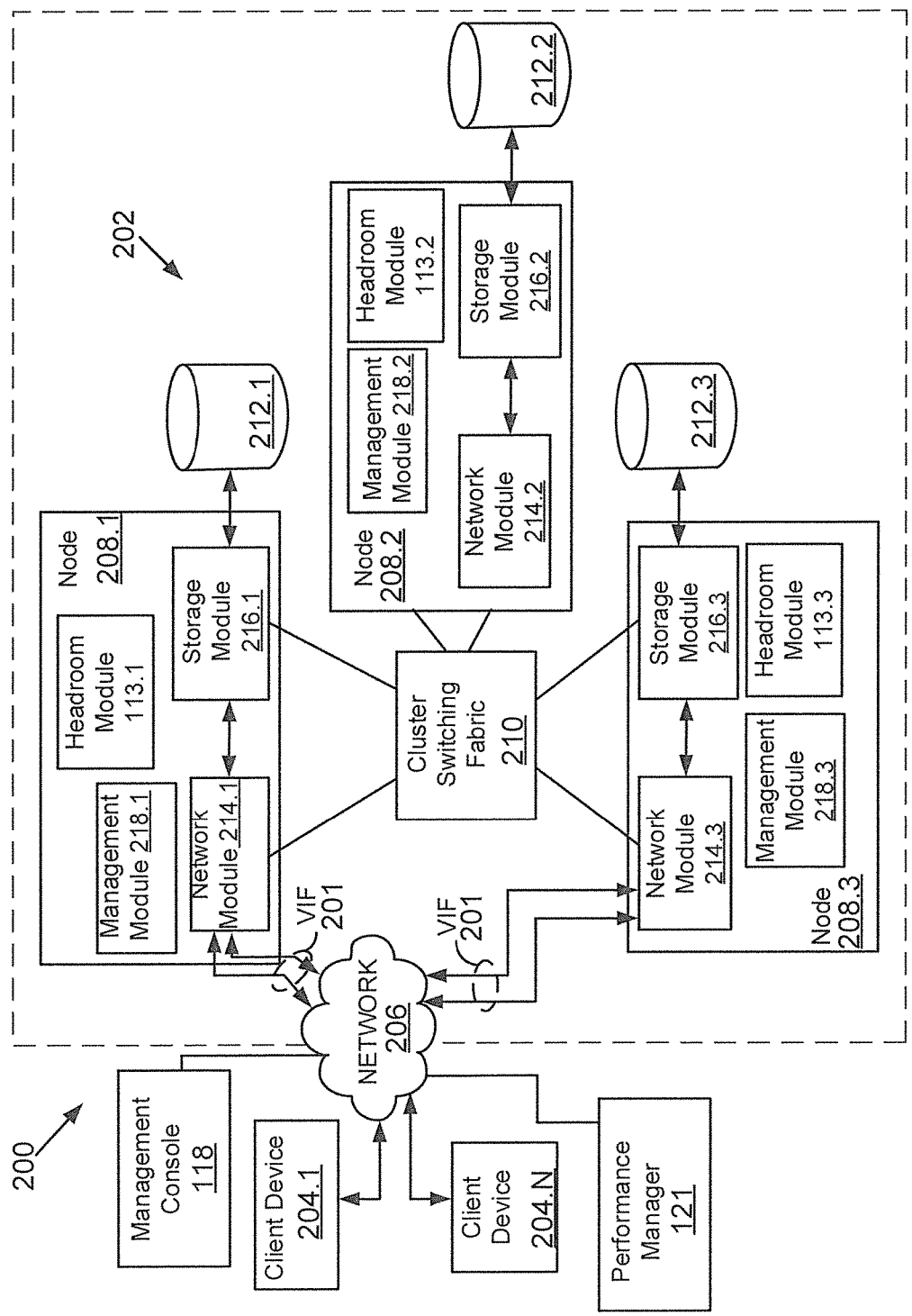
FIG. 2A shows an example of a clustered storage system, used according to one aspect of the present disclosure.

Although storage system 108 is shown as a stand-alone system, i.e. a non-cluster based system, in another aspect, storage system 108 may have a distributed architecture; for example, a cluster based system of FIG. 2A. Before describing the various aspects of the headroom manager 113, the following provides a description of a cluster based storage system.

Clustered Storage System:

FIG. 2A shows a cluster based storage environment 200 having various resources including a plurality of nodes for managing storage devices, according to one aspect. Storage environment 200 may include a plurality of client systems 204.1-204.N (similar to clients 116A-116N, FIG. 1B), a clustered storage system 202, performance manager 121, management console 118 and at least a network 206 communicably connecting the client systems 204.1-204.N and the clustered storage system 202.

The clustered storage system 202 includes a plurality of nodes 208.1-208.3, a cluster switching fabric 210, and a plurality of mass storage devices 212.1-212.3 (may be referred to as 212 and similar to storage device 114) that are used as resources for processing I/O requests.

Each of the plurality of nodes 208.1-208.3 is configured to include a network module (maybe referred to as N-module), a storage module (maybe referred to as D-module), and a management module (maybe referred to as M-Module), each of which can be implemented as a processor executable module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enable the respective nodes 208.1-208.3 to connect to one or more of the client systems 204.1-204.N over the computer network 206, while the storage modules 216.1-216.3 connect to one or more of the storage devices 212.1-212.3. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices 212.

Each node may execute or interface with the headroom module 113, shown as 113.1-113.3. The headroom module 113 may be executed at each node or a single headroom module may be used for the entire cluster. The aspects disclosed herein are not limited to the number of instances of headroom module 113 that may be used in a cluster.

A switched virtualization layer including a plurality of virtual interfaces (VIFs) 201 is provided to interface between the respective network modules 214.1-214.3 and the client systems 204.1-204.N, allowing storage 212.1-212.3 associated with the nodes 208.1-208.3 to be presented to the client systems 204.1-204.N as a single shared storage pool.

The clustered storage system 202 can be organized into any suitable number of virtual servers (also referred to as "vservers" or storage virtual machines (SVM)), in which each SVM represents a single storage system namespace with separate network access. Each SVM has a client domain and a security domain that are separate from the client and security domains of other SVMs. Moreover, each SVM is associated with one or more VIFs and can span one or more physical nodes, each of which can hold one or more VIFs and storage associated with one or more SVMs. Client systems can access the data on a SVM from any node of the clustered system, through the VIFs associated with that SVM. It is noteworthy that the aspects described herein are not limited to the use of SVMs.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Although FIG. 2A depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Figure 2B:
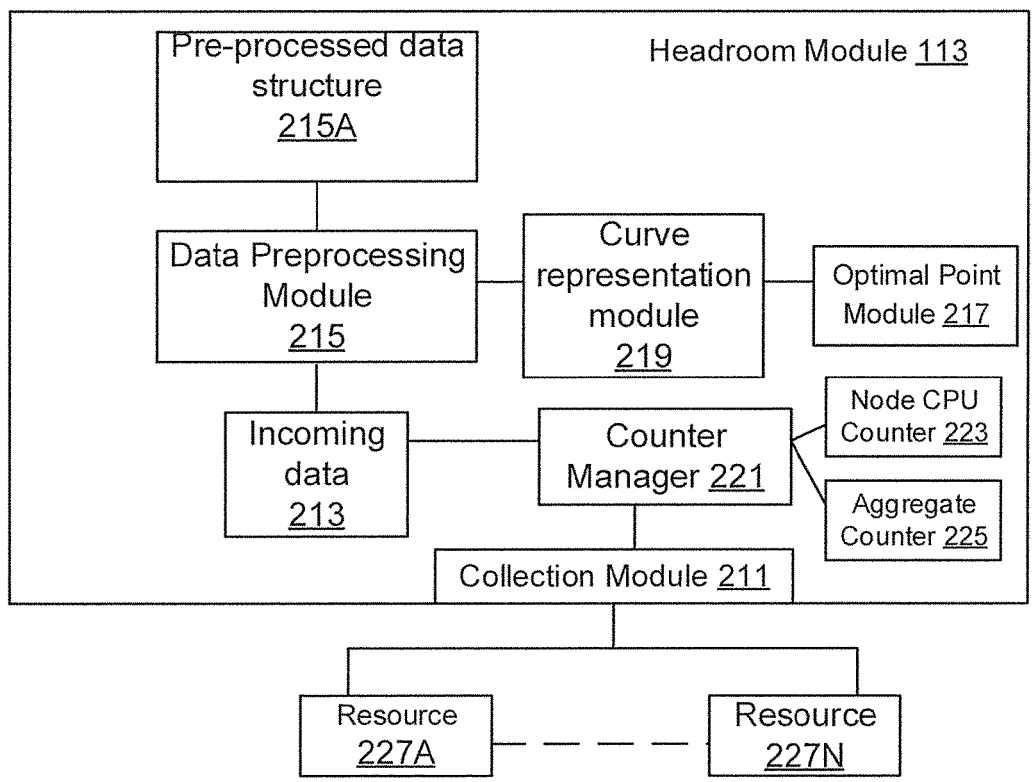
FIG. 2B shows an example of a headroom module, according to one aspect of the present disclosure.

Headroom Module 113:

FIG. 2B shows a block diagram of headroom module 113, according to one aspect. Headroom module 113 includes a counter manager 221 that receives performance data for different resources 227A-227N and maintains various counters for different resource type/data type. Examples include a node CPU counter 223 that tracks the performance of a storage module and/or a network module CPU performance and an aggregate counter 225 that tracks the utilization of a storage aggregate having a plurality of storage devices used by one or more cluster nodes.

Resources 227A-227N are used to process I/O requests. As an example, there are may be two types of resources, a service center and a delay center resource. The service center is a resource category that can be represented by a queue with a wait time and a service time (for example, a processor that processes a request out of a queue). The delay center may be a logical representation for a control point where a request stalls waiting for a certain event to occur and hence the delay center represents the delay in request processing. The delay center may be represented by a queue that does not include service time and instead only represents wait time. The distinction between the two resource types is that for a service center, the QOS data includes a number of visits, wait time per visit and service time per visit for incident detection and analysis. For the delay center, only the number of visits and the wait time per visit at the delay center are collected, as described below in detail.

Headroom module 113 also include a data pre-processing module 215 that evaluates incoming data 213 and ascertains a workload mix using the various techniques that are described below in detail. A data structure 215A is maintained to categorize workloads into the workload mix, based on the pre-processing by the data pre-processing module 215.

The headroom module 113 further includes a curve representation module 219 that generates the relationship between latency and utilization for resources 227A-227N based on the workload mix. An optimal module 217 uses an optimal point to determine the headroom at any given time, as described below in detail.

At a high level, the cluster nodes process workloads for retrieving or storing data. The workloads are defined based on incoming I/O requests and use resources within storage system 202 for processing I/O requests. A workload may include a plurality of streams, where each stream includes one or more requests. A stream may include requests from one or more clients. An example, of the workload model used by performance manager 121 is shown in FIG. 2F and described below. Before describing the details of determining headroom, the following provides an overview of the QOS infrastructure that may be used in cluster 202 of FIG. 2B.

Figure 2C:
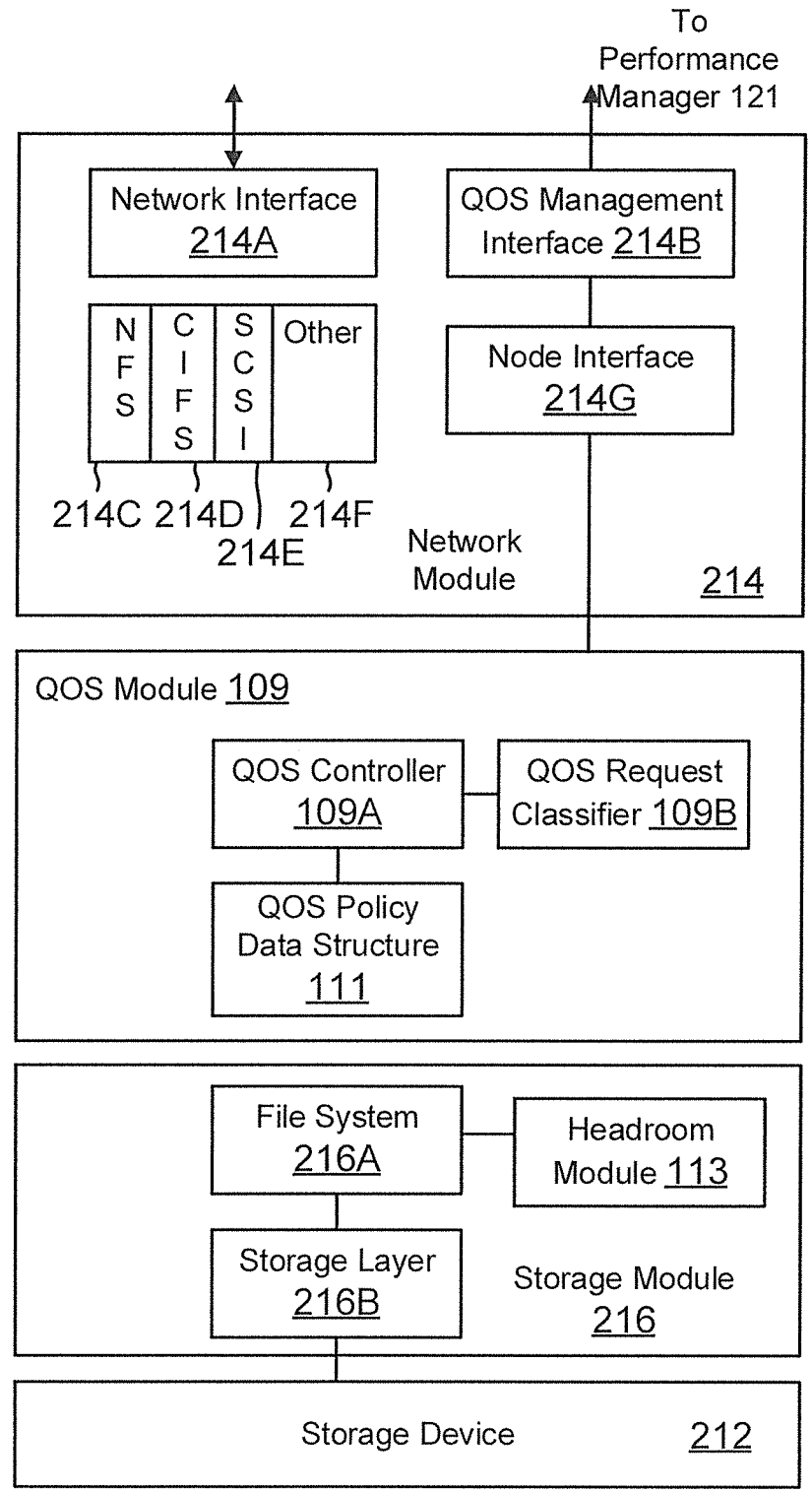
FIG. 2C shows an example of handling QOS requests by a storage system, according to one aspect of the present disclosure.

QOS Overview:

As shown in FIG. 2C, the network module 214 of a cluster includes a network interface 214A for receiving requests from clients. Network module 214 executes a NFS module 214C for handling NFS requests, a CIFS module 214D for handling CIFS requests, a SCSI module 214E for handling iSCSI requests and an others module 214F for handling "other" requests. A node interface 214G is used to communicate with QOS module 109, storage module 216 and/or another network module 214. QOS management interface 214B is used to provide QOS data from the cluster to performance manager 121.

QOS module 109 includes a QOS controller 109A, a QOS request classifier 109B and QOS policy data structure (or Policy_Group) 111. The QOS policy data structure 111 stores policy level details for implementing QOS for clients and storage volumes. The policy determines what latency and throughput rate is permitted for a client as well as for specific storage volumes. The policy determines how I/O requests are processed for different volumes and clients.

The storage module 216 executes a file system 216A (a part of storage operating system 107 described below in detail) and includes a storage layer 216B to interface with the storage device 212. The headroom module 113 described monitors resource usage and latency to track available resource capacity, described below in detail.

An I/O request arrives at network module 214 from a client or from an internal process directly to file system 216A. Internal process in this context may include a de-duplication module, a replication engine module or any other entity that needs to perform a read and/or write operation at the storage device 212. The request is sent to the QOS request classifier 109B to associate the request with a particular workload. The classifier 109B evaluates a request's attributes and looks for matches within QOS policy data structure 111. The request is assigned to a particular workload, when there is a match. If there is no match, then a default workload may be assigned.

Once the request is classified for a workload, then the request processing can be controlled. QOS controller 109A determines if a rate limit (i.e. a throughput rate) for the request has been reached. If yes, then the request is queued for later processing. If not, then the request is sent to file system 216A for further processing with a completion deadline. The completion deadline is tagged with a message for the request.

File system 216A determines how queued requests should be processed based on completion deadlines. The last stage of QOS control for processing the request occurs at the physical storage device level. This could be based on latency with respect to storage device 212 or overall node capacity/ utilization as described below in detail.

Figure 2D:
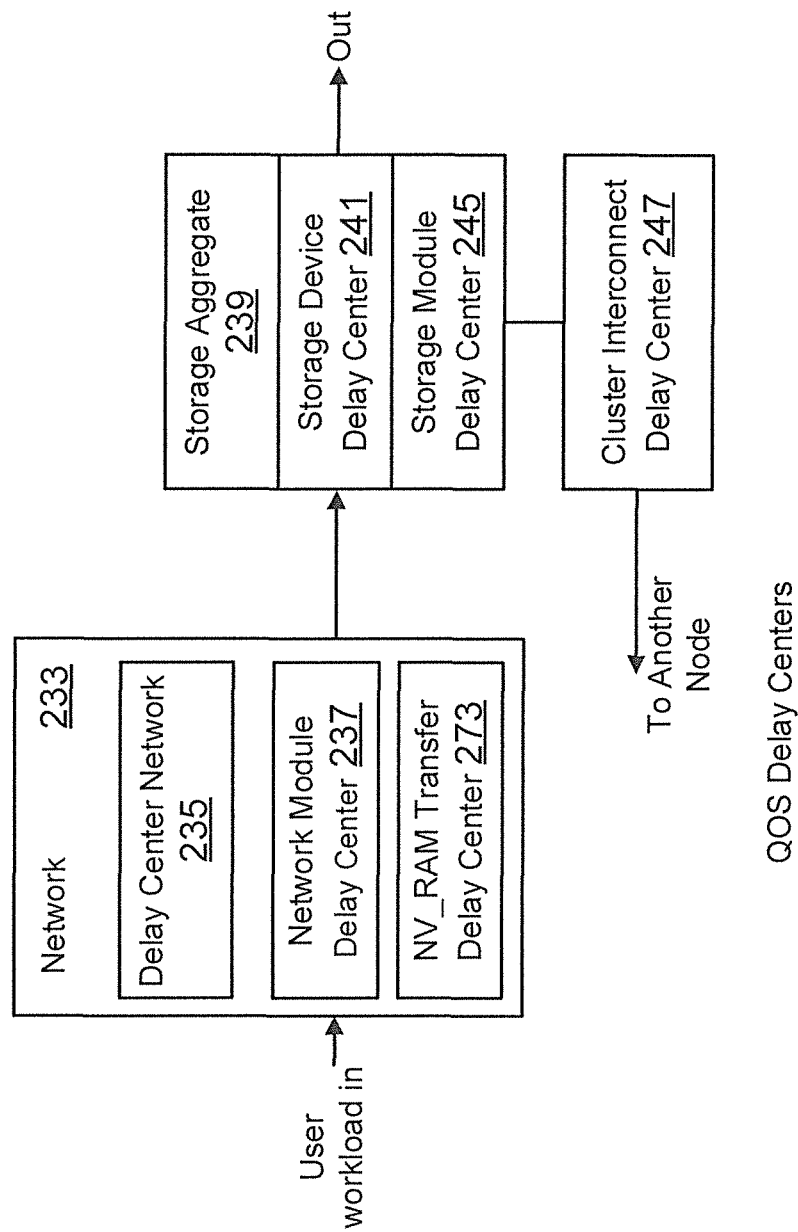
FIG. 2D shows an example of a resource layout used according to according to one aspect of the present disclosure.

Performance Model:

FIG. 2D shows an example of a queuing structure that may be used for determining headroom, according to one aspect. A user workload enters the queuing network from one end (i.e. at 233) and leaves at the other end.

Different flow types are used for allocating resources. A flow type is a logical view for modeling request processing from a particular viewpoint. The flow types include two categories, latency and utilization. A latency flow type is used for analyzing how long operations take at the service and delay centers. The latency flow type is used to identify a workload whose latency has increased beyond a certain level. A typical latency flow may involve writing data to a storage device based on a client request and there is latency involved in writing the data at the storage device. The utilization flow type is used to understand resource consumption of workloads and may be used to identify resource contention.

Referring now to FIG. 2D, delay center network 235 is a resource queue that is used to track wait time due to external networks. Storage operating system 107 often makes calls to external entities to wait on something before a request can proceed. Delay center 235 tracks this wait time using a counter (not shown).

Network module delay center 237 is another resource queue where I/O requests wait for protocol processing by a network module processor. This delay center 237 is used to track the utilization/capacity of the network module 216. Overutilization of this resource may cause latency, as described below in detail.

NV_RAM transfer delay center 273 is used to track how the non-volatile memory may be used by cluster nodes to store write data before, the data is written to storage devices 212, in one aspect.

A storage aggregate (or aggregate) 239 is a resource that may include more than one storage device for reading and writing information. Aggregate 239 is tracked to determine if the aggregate is fragmented and/or over utilized, as described below in detail.

Storage device delay center 241 may be used to track the utilization of storage devices 212. In one aspect, storage device utilization is based on how busy a storage device may be in responding to I/O requests.

In one aspect, storage module delay center 245 is used for tracking node utilization. Delay center 245 is tracked to monitor the idle time for a CPU used by the storage module 216, the ratio of sequential and parallel operations executed by the CPU and a ratio of write duration and flushing duration for an NVRAM at the storage module (not shown).

Nodes within a cluster communicate with each other. These may cause delays in processing I/O requests. The cluster interconnect delay center 247 is used to track the wait time for transfers using the cluster interconnect system. As an example, a single queue maybe used to track delays due to cluster interconnects.

There may also be delay centers due to certain internal processes of storage operating system 107 and various queues may be used to track those delays. For example, a queue may be used to track the wait for I/O requests that may be blocked for file system reasons. Another queue (Delay_Center_Susp_CP) may be used to represent the wait time for Consistency Point (CP) related to the file system 216A. During a CP, write requests are written in bulk at storage devices and this will typically cause other write requests to be blocked so that certain buffers are cleared.

Figure 2E:
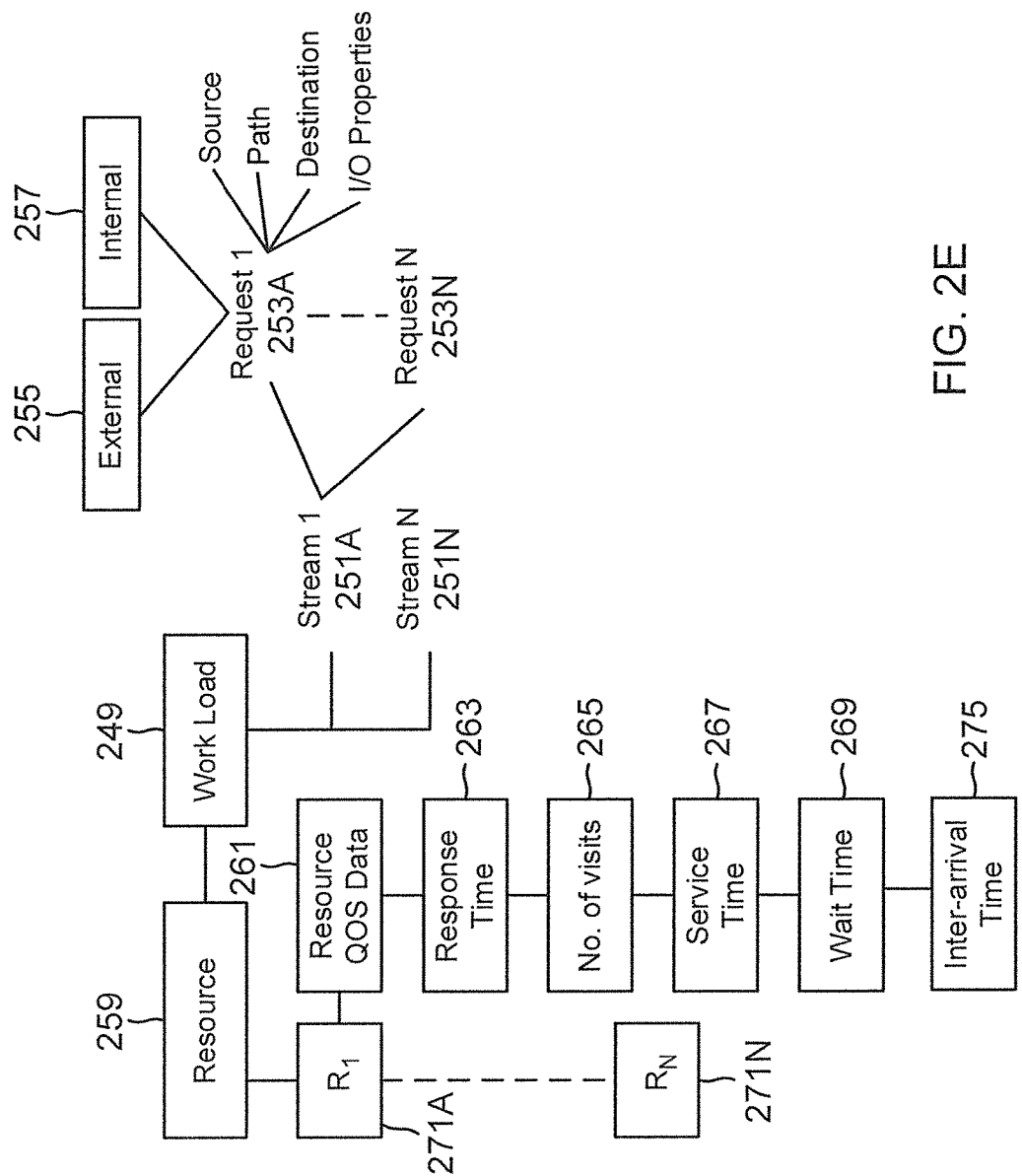
FIG. 2E shows an example of managing workloads and resources, according to one aspect of the present disclosure.
Figure 2F:
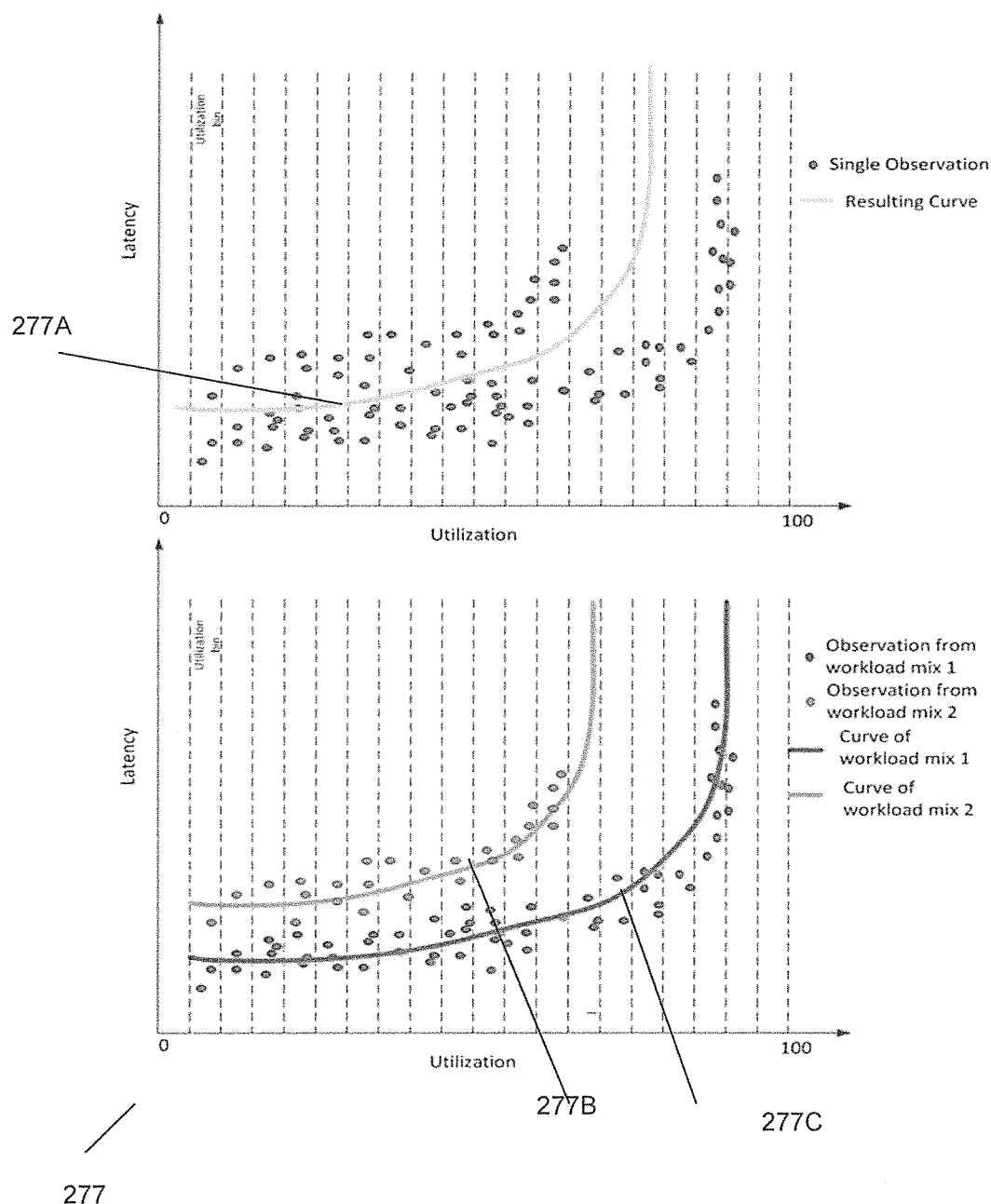
FIG. 2F shows a graphical illustration of various challenges in managing resources based on differences in workload mix in a conventional storage environment.

Workload Model:

FIG. 2E shows an example, of the workload model used according to one aspect. As an example, a workload may include a plurality of streams 251A-251N. Each stream may have a plurality of requests 253A-253N. The requests may be generated by any entity, for example, an external entity 255, like a client system and/or an internal entity 257, for example, a replication engine that replicates storage volumes at one or more storage location.

A request may have a plurality of attributes, for example, a source, a path, a destination and I/O properties. The source identifies the source from where a request originates, for example, an internal process, a host or client address, a user application and others.

The path defines the entry path into the storage system. For example, a path may be a logical interface (LIF) or a protocol, such as NFS, CIFS, iSCSI and Fibre Channel protocol. A destination is the target of a request, for example, storage volumes, LUNs, data containers and others. I/O properties include operation type (i.e. read/write/other), request size and any other property.

In one aspect, streams may be grouped together based on client needs. For example, if a group of clients make up a department on two different subnets, then two different streams with the "source" restrictions can be defined and grouped within the same workload.

A workload uses one or more resources (for example, 259 or 227A-227N, FIG. 2B) for processing I/O requests shown as 271A-271N as part of a resource object 259. The resources include service centers and delay centers that have been described above with respect to FIG. 2D. For each resource, a counter/queue is maintained by the counter manager 221 for tracking different statistics (or QOS data) 261. For example, a response time 263, and a number of visits 265, a service time (for service centers) 267, a wait time 269 and inter-arrival time 275 are tracked. Inter-arrival time 275 is used to track when an I/O request for reading or writing data is received at a resource. The term QOS data as used throughout this specification includes one or more of 263, 265, 267 and 269 according to one aspect.

A plurality of counter objects maybe used for resource monitoring and headroom analysis, according to one aspect. Without limiting the various adaptive aspects, an example of the various counter objects are shown and described in Table I below:

TABLE I

| Workload Object Counters | Description |
| --- | --- |
| OPS | A number of workload operations that are completed during a measurement interval, for example, a second. |
| Read_ops | A number of workload read operations that are completed during the measurement interval. |
| Write_ops | A number of workload write operations that are completed during the measurement interval. |
| Total_data | Total data read and written per second by a workload. |

TABLE I-continued

| Workload Object Counters | Description |
| --- | --- |
| Read_data | The data read per second by a workload. |
| Write_data | The data written per second by a workload. |
| Latency | The average response time for I/O requests that were initiated by a workload. |
| Read_latency | The average response time for read requests that were initiated by a workload. |
| Write_latency | The average response time for write requests that were initiated by a workload. |
| Classified | Requests that were classified as part of a workload. |
| Read_IO_type | The percentage of reads served from various components (for example, buffer cache, ext_cache or disk). |
| Concurrency | Average number of concurrent requests for a workload. |
| Interarrival_time_sum_squares | Sum of the squares of the Inter-arrival time for requests of a workload. |

Without limiting the various aspects of the present disclosure, Table II below provides an example of the details associated with the object counters that are monitored, according to one aspect:

TABLE II

| Workload Detail Object Counter | Description |
| --- | --- |
| Visits | A number of visits to a physical resource per second; this value is grouped by a service center. |
| Service_Time | A workload's average service time per visit to the service center. |
| Wait_Time | A workload's average wait time per visit to the service center. |

Different workload mixes at a resource have different LvU curves. So by mixing observations of performance metrics (e.g. utilization, latency, and throughput) from different workload mixes a resulting LvU curve and consequently the estimated performance capacity maybe be inaccurate because the accuracy depends on using the most representative curve for a current workload mix.

FIG. 2F illustrates the challenge with accurately predicting remaining performance capacity at a clustered networked storage system 202 in conventional systems. Assume that a storage resource is serving a read-dominant workload for portions of the day and a write-dominant workload for portions of the day. Over some time, a large set of performance metrics (for example, utilization, latency, and throughput) is collected and can be used to generate the LvU so that performance capacity of the resource can be determined. For the LvU curve 277A, all observations are used without the distinction of the workload mix. The optimal performance capacity based on curve 277A is around 70% raw utilization of the resource.

The set of observations however maybe grouped in two categories—following the above assumption, a first category for the read-dominant workload and a second category for the write-dominant workload. LvU curve 277B is only for the write dominant workloads and curve 277C is only for the read dominant workloads. The optimal performance capacity for the read-dominant workloads is at about 80% raw utilization and the optimal performance capacity for the write-dominant workloads is at about 60% raw utilization.

If one were to use the 70% optimal performance capacity only using curve 277A, then the performance capacity at any given time is overestimated for the write-dominant workloads, causing potential issues with resource allocation and management by the storage operating system. The various aspects described below solve these conventional challenges by efficiently categorizing workloads in real time such that available performance capacity can be predicted accurately. Before describing the processes in detail, the following describes an object hierarchy for managing resource information.

Figure 3A:
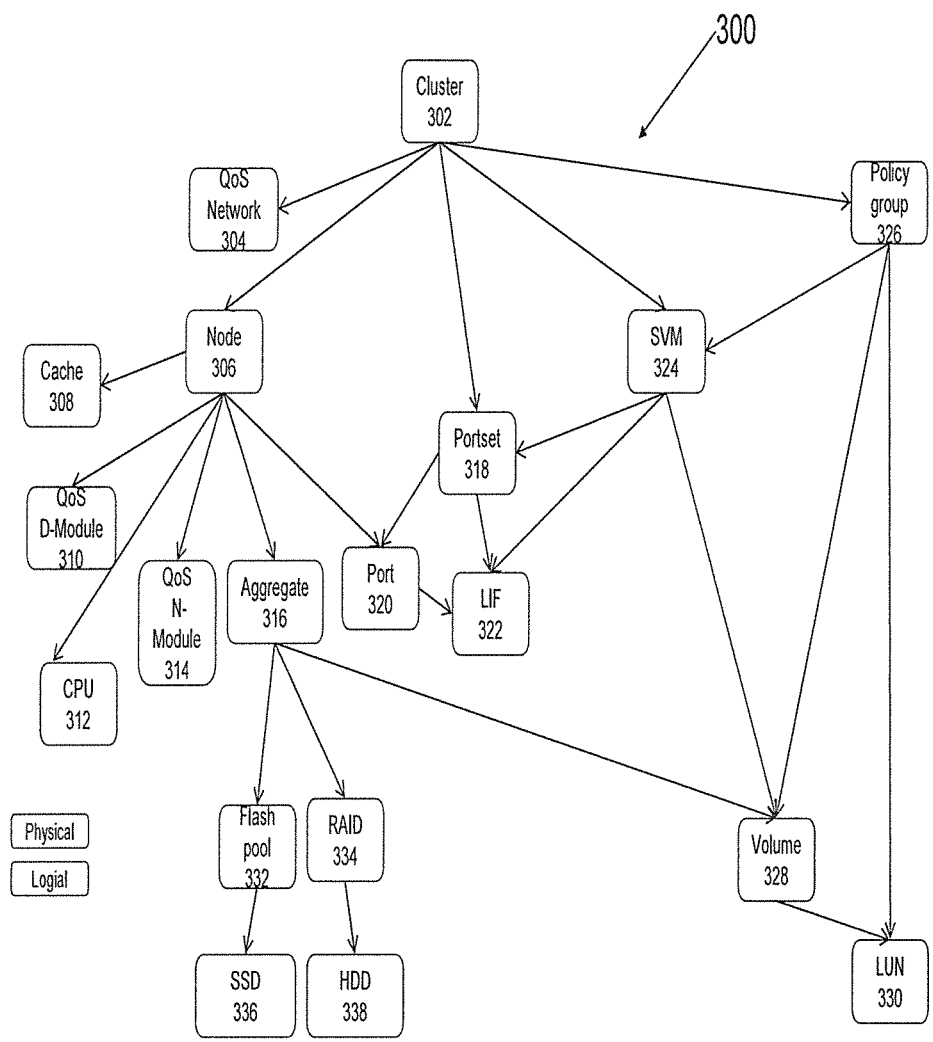
FIG. 3A shows a format for managing various resource objects, according to one aspect of the present disclosure.

Object Hierarchy:

FIG. 3A shows an example of a format 300 for tracking information regarding different resources that are used within a clustered storage system (for example, 202, FIG. 2A). Each resource is identified by a unique resource identifier value. The resource identifier value may be used to obtain available performance capacity (headroom) of a resource.

Format 300 maybe hierarchical in nature where various objects may have parent-child, peer and remote peer relationships, as described below. As an example, format 300 shows a cluster object 302 that may be categorized as a root object type for tracking cluster level resources. The cluster object 302 is associated with various child objects, for example, a node object 306, QOS network object 304, a portset object 318, a SVM object 324 and a policy group 326. The cluster object 302 stores information regarding the cluster, for example, the number of nodes it may have, information identifying the nodes; and any other information.

The QOS network object 304 is used to monitor network resources, for example, network switches and associated bandwidth used by a clustered storage system.

The cluster node object 306 stores information regarding a node, for example, a node identifier and other information. Each cluster node object 306 is associated with a pluralities of child objects, for example, a cache object 308, a QOS object for a storage module 310, a QOS object for a network module 314, a CPU object 312 and an aggregate object 316. The cache object 308 is used to track utilization/latency of a cache. The QOS storage module 310 tracks the QOS of a storage module defined by a QOS policy data structure 111 described above in detail with respect to FIG. 2D. The QOS network module object 314 tracks the QOS for a network module. The CPU object 312 is used to track CPU performance and utilization of a node.

The aggregate object 316 tracks the utilization/latency of a storage aggregate that is managed by a cluster node. The aggregate object may have various child objects, for example, a flash pool object 332 that tracks usage of a plurality of flash based storage devices (shown as "flash pool"). The flash pool object 332 may have a SSD disk object 336 that tracks the actual usage of specific SSD based storage devices. The RAID group 334 is used to track the usage of storage devices configured as RAID devices. The RAID object 334 includes a storage device object 338 (shown as a HDD (hard disk drive) that tracks the actual utilization of the storage devices.

Each cluster is provided a portset having a plurality of ports that may be used to access cluster resources. A port includes logic and circuitry for processing information that is used for communication between different resources of the storage system. The portset object 318 tracks the various members of the portset using a port object 320 and a LIF object 322. The LIF object 322 includes a logical interface, for example, an IP address, while the port object 320 includes a port identifier for a port, for example, a worldwide port number (WWPN). It is noteworthy that the port object 320 is also a child object of node 306 that may use a port for network communication with clients.

A cluster may present one or more SVMs to client systems. The SVMs are tracked by the SVM object 324, which is a child object of cluster 302. Each cluster is also associated with a policy group that is tracked by a policy group object 326. The policy group 326 is associated with SVM object 324 as well as storage volumes and LUNs. The storage volume is tracked by a volume object 328 and the LUN is tracked by a LUN object 330. The volume object 328 includes an identifier identifying a volume, size of the volume, clients associated with the volume, volume type (i.e. flexible or fixed size) and other information. The LUN object 330 includes information that identifies the LUN (LUNID), size of the LUN, LUN type (read, write or read and write) and other information.

Figure 3B:
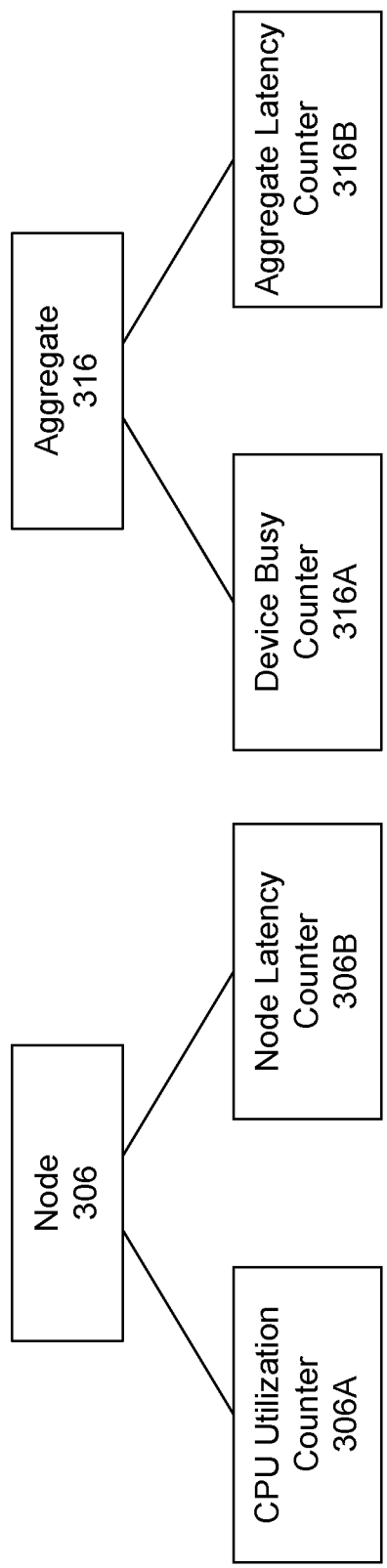
FIG. 3B shows an example of certain counters that are used for managing resources, according to one aspect of the present disclosure.

FIG. 3B shows an example of some additional counters that are used for headroom analysis, described below in detail. These counters are related to nodes and aggregates and are in addition to the counters of Table I described above. For example, counter 306A is used to track the utilization i.e. idle time for each node processor. Node latency counter 306B tracks the latency at the nodes based on operation types, i.e. read and write operations. The latency may be based on the total number of visits at a storage system node/number of operations per second for a workload. This value may not include internal or system default workloads, as described below in detail.

Aggregate utilization is tracked using counter 316A that tracks the duration of how busy a device may be for processing user requests. An aggregate latency counter 316B tracks the latency due to the storage devices within an aggregate. The latency may be based on a measured delay for each storage device in an aggregate. The use of these counters for headroom analysis is described below in detail.

Figure 4A:
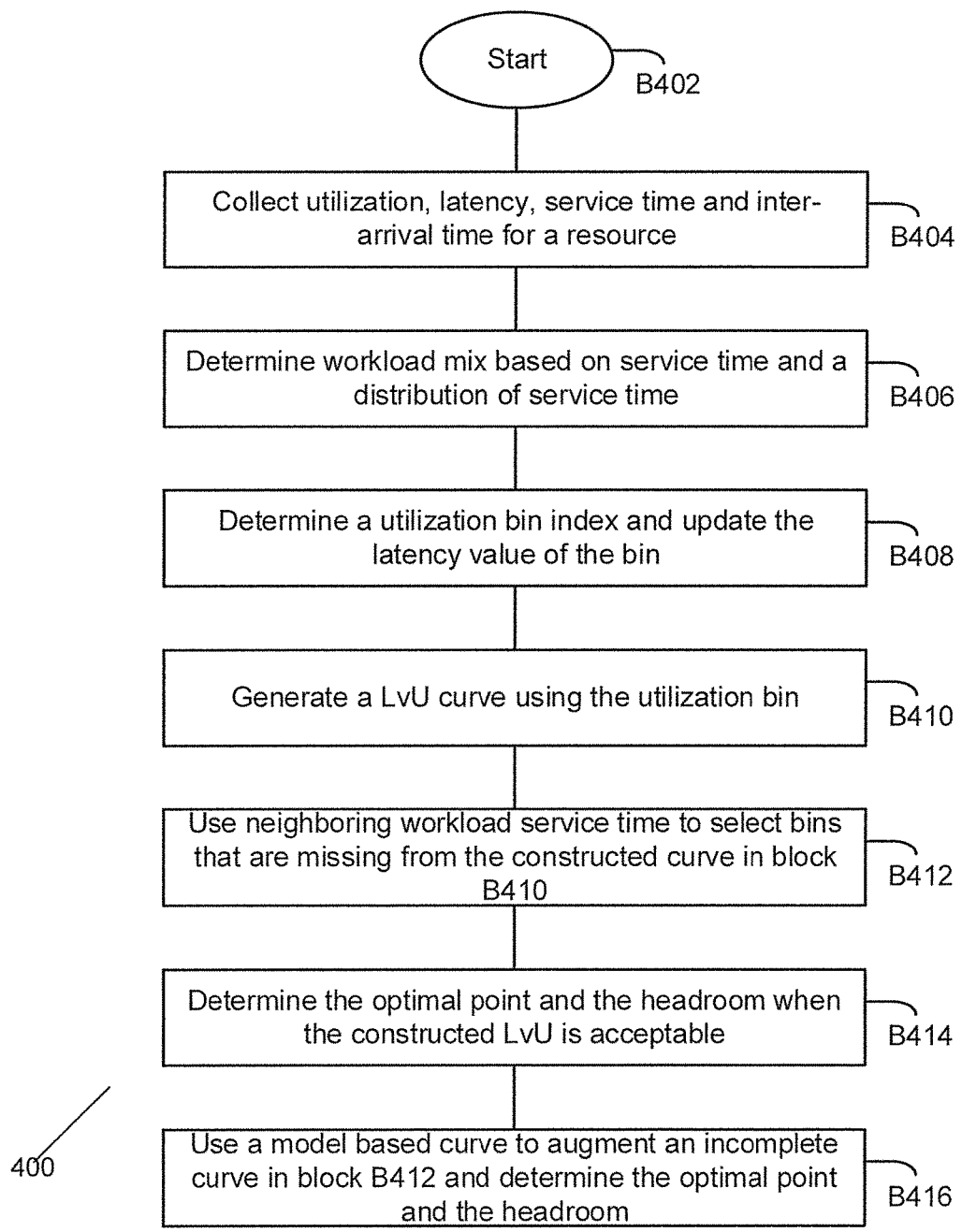
FIG. 4A shows an example of an overall process flow for determining headroom in a storage environment, according to one aspect of the present disclosure.

Headroom Determination and Analysis:

FIG. 4A shows an overall machine implemented process flow 400 for determining headroom by the headroom module 113, according to one aspect of the present disclosure. The process begins in block B402, when the storage system 108/cluster 202 is operational and data has been stored at the storage devices for one or more clients.

In block B404, some performance data (for example, latency and utilization data, inter-arrival times and/or service times) for a resource, for example, the cluster nodes and aggregates is collected by the collection module 211 of the headroom module 113. The data is collected either based on a schedule or on demand. The collected data type varies based on the resource type, as described above. In one aspect, the collection module 211 includes logic and circuitry to interface with different resources and obtain performance information regarding the resources. The collected data 213 (FIG. 2B) is provided to the data pre-processing module 215 for pre-processing for determining a workload mix.

For a resource at the networked storage system 202, the workload mix can be characterized based on a plurality of parameters, for example, the read/write ratio indicating the number of read and write operations, sequential nature of read and/or write operations, random nature of read and/or write operations and locality of reference. The higher the number of parameters to categorize the workload mix, the more complex its characterization and therefore, it is difficult to compute the workload mix for a resource in real-time.

For simplicity and accuracy, one may monitor the result of a process rather than model its input and process the details to determine an outcome. With regard to categorizing different workload mix in the clustered storage environment, the processing of workload mix requests, i.e., the average service time at the resource may indicate the various input descriptors of a specific workload mix. For example, workload mix that differ in their read/write ratio may have different service times at the resource. Similarly randomness in workload mix may impact both a mean and variance of the service times. Specifically, higher the sequential nature of the requests and the write ratio, higher the mean and variance of the service time at a resource.

To efficiently categorize performance metrics or observations of utilization, latency and throughput, about 3*n categories may be defined by the headroom module 113. For example, there may be n different categories of average service times per resource and 3 different categories of variance per category of service time mean. As an example, two parameters, the average service time and a service time distribution coefficient may be used to categorize workloads. In one aspect, in block B406, the data pre-processing module 215 first categorizes a workload mix based on the average service time and a coefficient of distribution of service time. In one aspect, the workload mix categories are determined based on a range of average expected service times at a given resource. For example, at a CPU resource, the average service time maybe expected to be in the few hundreds microseconds, starting from about 100 microseconds to about 500 microseconds. As a result this range of possible service times is divided into equally-spaced intervals. Based on the observed service time, the subset of three categories where the observation belongs is determined. In one aspect, there may be categories, particularly the one capturing the upper tail of service times where the spacing between categories is not done in an equally-likely fashion rather geometric. This is due to the tail capturing special and rare cases of workload mixes that similarly reduce performance capacity.

The data pre-processing module 215 also determines the service time distribution coefficient that is used to determine if a workload mix is constant, random, or has high variability. The estimation of service time distribution coefficient is based on the coefficient of variation (CV) and as a result is a unit-less measure of the variability of the service process.

The service time distribution coefficient is given by the formula $$DC_{st} = \frac{1 + CV_{st}^2}{2}$$

where $CV_{st}$ is the service time coefficient of variance

For accurately determining headroom, the headroom module 113 also ascertains the stability of the observations. Typically, an observation is selected only if it is measured during a period of time when both the utilization and the service times of the resource remain stationary, i.e., the defined period of time. This is to avoid any observations measured during any transition period that maybe less reliable than those measured during stationary period. If an observation is measured during a transitional period then the probability of it being an outlier is higher. As a result such observations are excluded.

In block B408, the data pre-processing module 215 further categorizes the workload mix using utilization bins and utilization bin index values. In one aspect, a utilization bin index (explained below in detail with respect to FIG. 4B) value is determined for an observed latency value at a current time. The utilization bin index places the utilization of a resource in a bin that is defined by a utilization range. The latency value for the associated bin index is also updated.

Figure 4B:
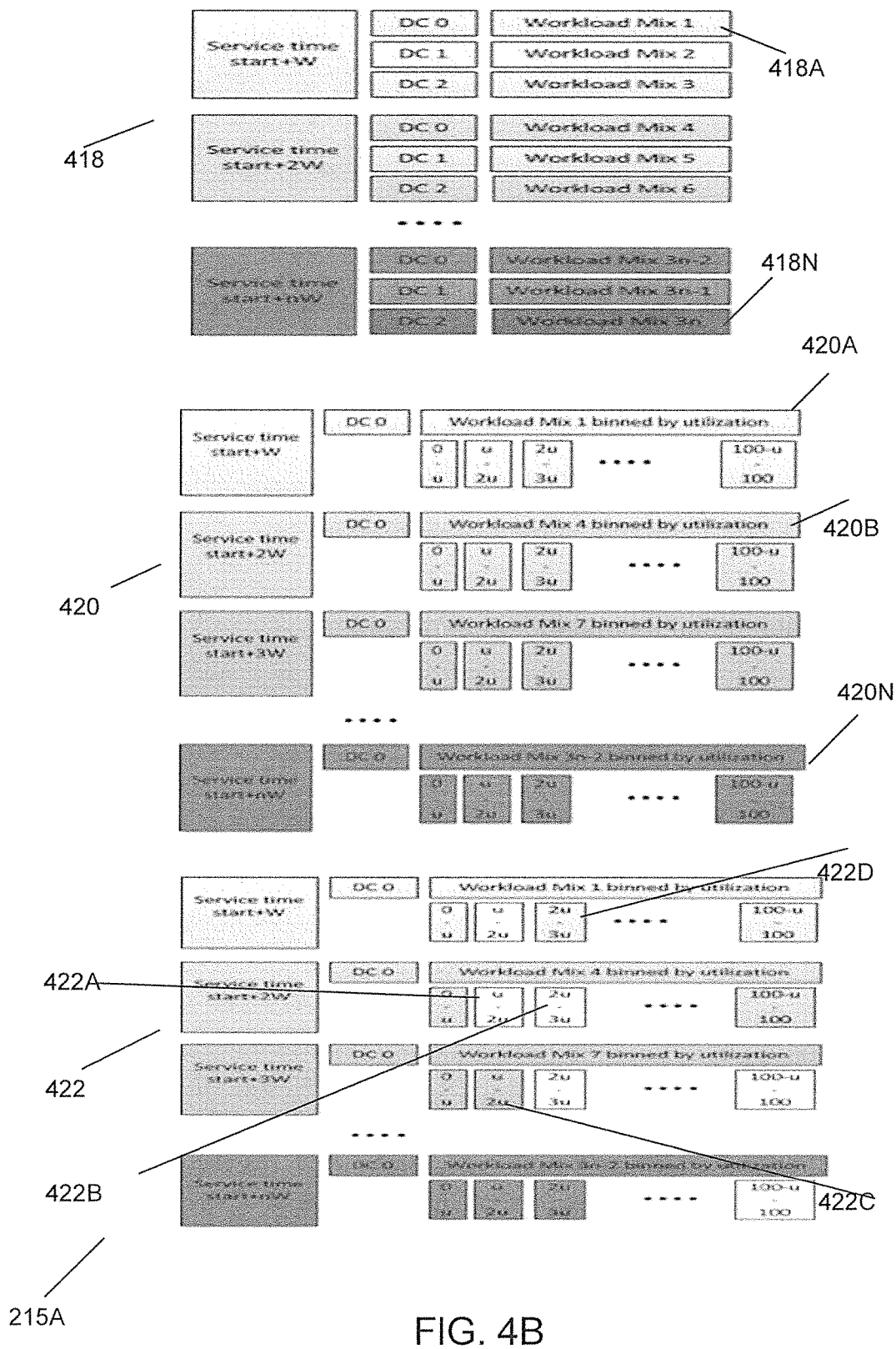
FIG. 4B shows examples of pre-processing resource data, according to one aspect of the present disclosure.

FIG. 4B shows an example of data structure 215A that is created by the data pre-processing module 215 in blocks B406 and B408 for categorizing workload mix. The data structure 215A is stored at a storage location by a processor. The first categorization 418 is based on average service time and distribution coefficient (DC). A first row starts with (service time +W) and the last range is (service time +nW). DC0, DC1, DC3 are the distribution of coefficients associated with each service time range. For example, 418A shows a first workload mix that is placed at service time +W range. Within this range there may be various DCs, for example, DC0, DC1 and DC2. The Nth row is shown as 418N, which is self-explanatory. The workload mix are defined by an appropriate category based on the service times and the DC. Any set of observations (latency, utilization) for a given resource belong to a single category at any given moment of time. Between two different times the observations can fall into different categories or within the same category.

The categorization of observations 418 is used every time performance capacity needs to be estimated for a resource, which maybe every time a new observation is measured. Specifically, for a current observation, the service time average and the service time distribution coefficient are used to determine the workload mix index (or category). Then all the historical observations already in that category are retrieved to construct the LvU for the current workload mix at the resource described below in detail.

FIG. 4B also shows an example 420, where utilization bins are used in conjunction with the service time and DC categorization 418. In this example, the utilization bins are assumed to be of equal size of u, where u maybe set to 5% but it can be of any value within the raw utilization range of 0-100%. For example, in row 420A, the service time +W with DC0 includes workload mix bin utilization index value. The index value may fall anywhere between 0-100. 420B shows Workload mix 4 and below that is shown workload mix 7.

When a new set of performance metrics are observed, the service time and distribution coefficient are used to determine the category where the observation belongs and the raw utilization is used to determine the utilization bin index value. Each utilization bin stores a single exponentially discounted average value for compact storage eliminating the need for storing actual utilization values for different workload mix, which can take a large amount of storage space. So a current value at a utilization bin, if any, is used to calculate a new value based on a new observation of latency for that workload mix and utilization range.

Categorization 422 shows observation bins for workloads of different service time groups but the same distribution coefficient category (for example, DC0). This is maintained because headroom module 113 assumes that observations of the same distribution coefficient category and neighboring service time classes maybe similar and can be used to fill gaps in collected data. For example, in categorization 422, in the second row (Workload Mix 4) utilization bins 422A and 422B do not have any values (hence the blocks are unshaded). For the utilization bin u-2u, the neighboring bin value at 422C may be used to fill in the gap and 422D may be used to fill the gap for utilization bin 2u-3u.

Figure 6A:
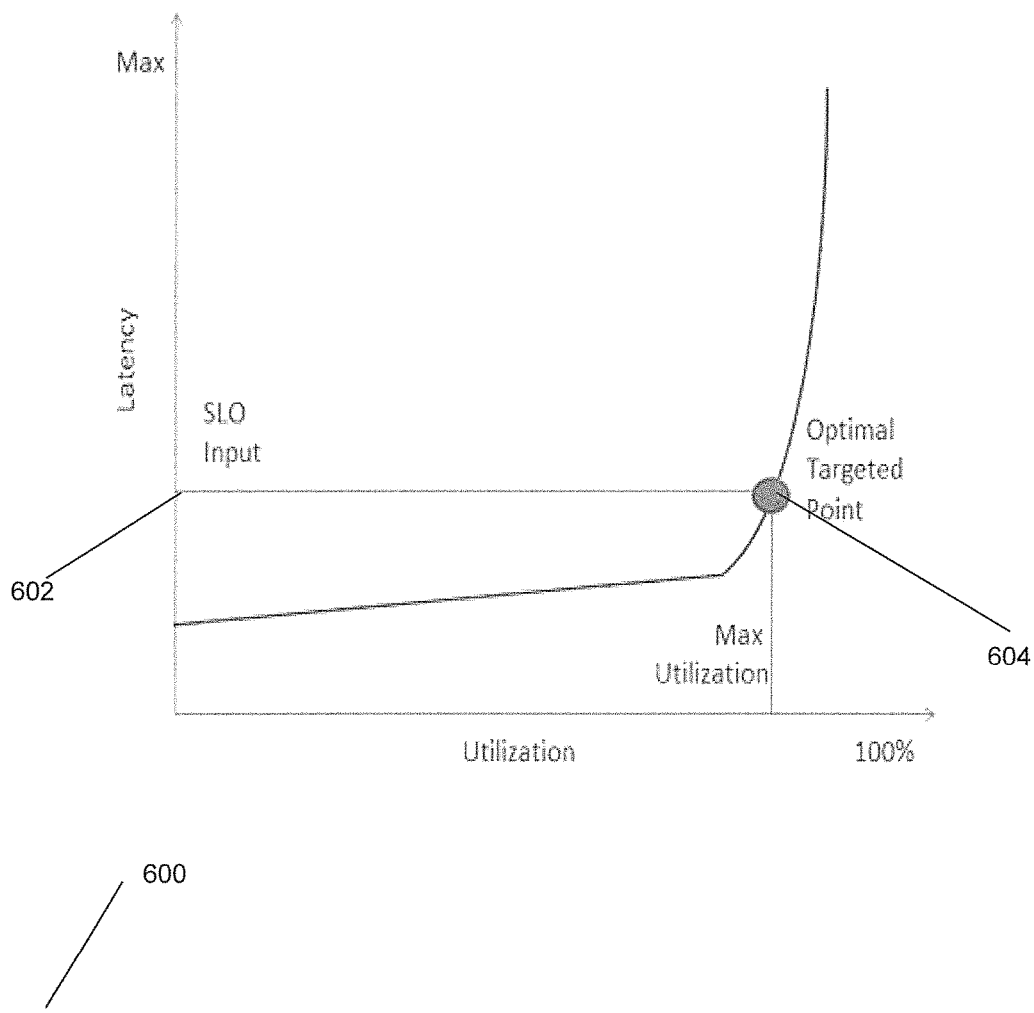
FIG. 6A shows an example of using a custom operational point on a LvU curve, according to one aspect of the present disclosure.

In block B410, curve representation module 219 attempts to generate the LvU curve using the categorized observations for a particular workload mix. In one aspect, a finite number of curves may be generated (for example, 30). Of course, the aspects disclosed herein are not limited to any specific number of curves. If there are missing utilization bin values, then in block B412, neighboring values (for example see FIG. 4B, 422C and 442D) with different service times but same distribution coefficient value may be used. If the curve is complete, then an optimal point is determined by the optimal point module 217, for example, as shown at FIGS. 6A/6B. This provides the available resource capacity at any given time.

FIG. 6A shows an example of an LvU curve 600, which uses a SLO input (for example, from a policy) 602. The SLO input defines a latency limit/maximum utilization that is assigned for user/resource. The custom optimal point is determined by the intersection of the SLO input and the LvU curve, shown as 604.

Figure 6B:
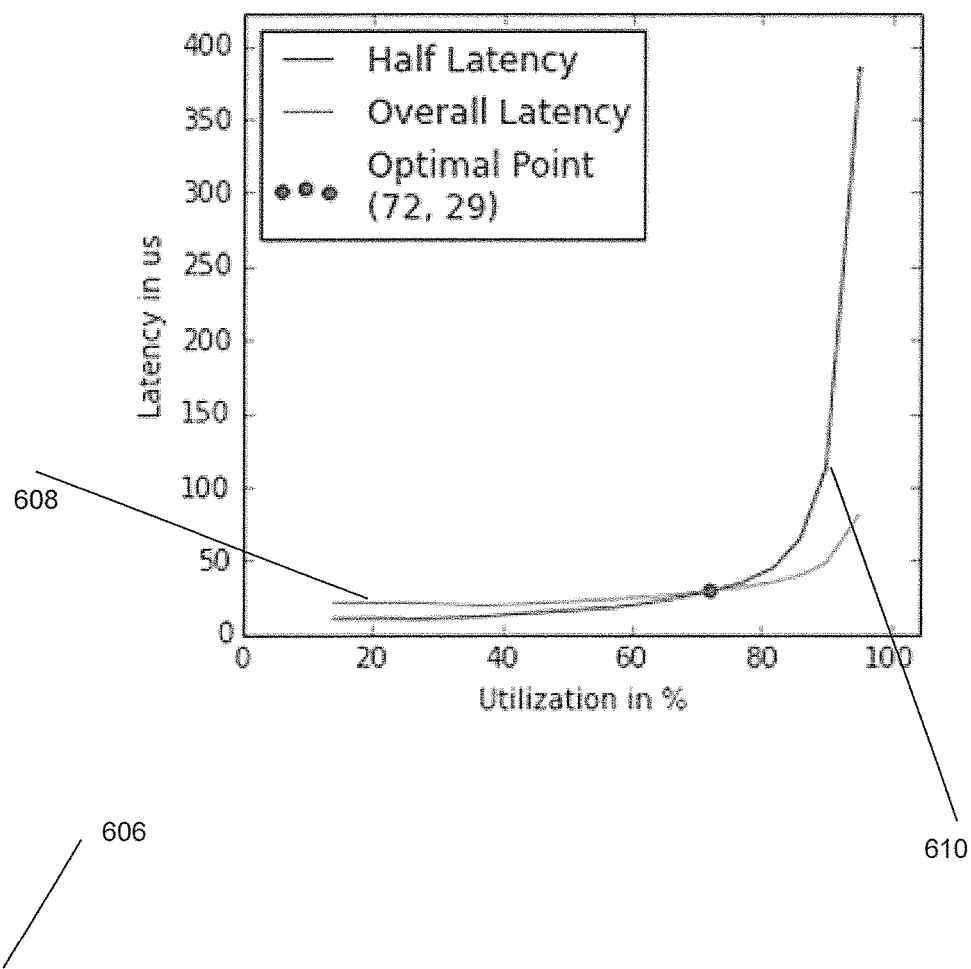
FIG. 6B shows an example determining an operational point, according to one aspect of the present disclosure.

FIG. 6B shows an example 606 for identifying the optimal point using the "point of diminishing returns" approach. In FIG. 6B the intersection of a half latency v utilization curve 610 and the overall latency curve 608 may be identified as the optimal point.

In one aspect, different operational points may be used for a resource based on the operating environment and how the resources are being used. For example, a current total utilization may be used as an operational point with the presumption that the current total utilization may be used to process a workload mix.

If the curve is not complete, then a model based curve is generated and used to augment the curve generated in block B412. Thereafter, the optimal point is determined by the optimal point module 217. The model based technique uses current observations and queuing models to complete the LvU curve. The model based technique uses inter-arrival times and service times for a resource. The inter-arrival times track the arrival times for I/O requests at a resource, while the service times track the duration for servicing user based I/O requests. Details of a model based curve are provided below with respect to FIG. 5.

Figure 5:
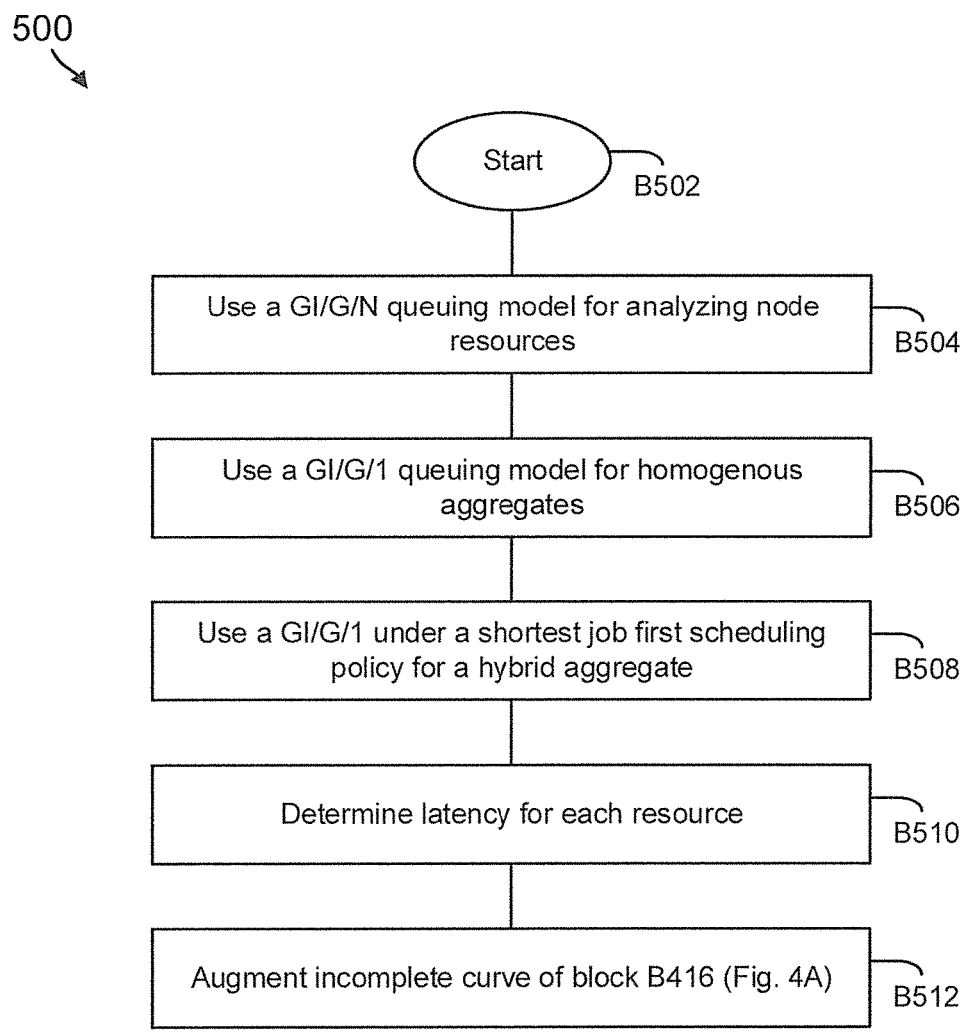
FIG. 5 shows a process flow for determining an optimal point on a LvU curve using a model based technique; according to one aspect of the present disclosure.

Model Based Optimal Point Determination:

FIG. 5 shows a process 500 for using a model-based technique by the headroom module 113 (e.g. the curve representation module 219) for block B416 of FIG. 4A, according to one aspect. The model based technique begins in block B502. The model based technique uses analytic models with inter-arrival times at the resources (average and variance) as well as the service times (average and variance) for each resource to process a workload mix. A queuing model is used for evaluating each resource in the networked storage environment. As an example, each resource may be modelled as a GI/G/I queue such that that a service center where requests arrive according to a general independent stochastic process and are served according to a general stochastic process by a single node, according to FCFC (First Come, First Served) methodology. If the service center includes N node resources, then the queuing model is GI/G/n. In one aspect, I/O request arrivals and service at a resources are parameterized at any given time. In one aspect, as described below, different queuing models are used for different resources.

In block B504, the process uses the GI/G/N (where N is the number of cores that act as servers in the queuing model) for node resources, for example, a multi-core CPU of a node.

In block B506, SSD and hard drive aggregates are queued under GI/G/1 model by the process because in an aggregate, the I/O requests are expected to be uniformly served by all the storage devices in the aggregate and hence GI/G/1 is an accurate representation.

When an aggregate is a hybrid aggregate i.e. includes both SSD and hard drives, then a GI/G/1 queuing model under the shortest job first (SJF) scheduling policy is used in block B508. The reason for using this model is because in hybrid aggregates, the service time may be variable since some I/O requests are served at a faster rate while others at a lower rate.

In block B510, the estimated latency is determined by the headroom module 113 for each resource using the inter-arrival time and service time. The latency may be expressed as $T_r$. In one aspect, Kingman's formula for GI/G/1 queues maybe used to estimate $T_r$ of the resource based on the equation provided below:

$$T_r = T_s + \frac{\rho T_s(c_a^2 + c_s^2)}{2(1-\rho)}. \quad (1)$$

$T_s$ is the expected service time at the resource
$\rho$ is the current utilization in the resource
$c_a^2$ and $c_s^2$ are the squared coefficient of variations (CV) for inter-arrival times and service times at the resource, respectively.

Kingman's formula is an approximation for the GI/G/1 queues. And hence a correction factor $G_{KLB}$ may be used for correcting the expected latency defined by equation [2] below:

$$G_{KLB} = \begin{cases} \exp\left(\frac{2}{3} \cdot \frac{1-\rho}{P_n} \cdot \frac{(1-c_a^2)^2}{c_a^2 + c_s^2}\right), & 0 \leq c_a^2 \leq 1 \\ \exp\left(-(1-\rho)\frac{c_a^2 - 1}{c_a^2 + c_s^2}\right), & c_a^2 > 1 \end{cases} \quad (2)$$

The incorporation of $G_{KLB}$ modifies the Kingman formula as:

$$T_r = T_s + \frac{\rho T_s(c_a^2 + c_s^2)}{2(1-\rho)} G_{KLB}, \quad (3)$$

which tend to return lower latency values compared to (1).

Latency in a GI/G/1/SJF (Shortest Job First) queue the latency is determined by:

$$T_r(x) = T_s + \frac{\rho(x)T_s(c_a^2 + c_s^2)}{2(1-\rho(x))} G_{KLB}$$

Where x is a specific service time in the full range $[s_{min}, s_{max}]$ of the service times at the resource and
$\rho(x) = \rho T_s \int_{s_{min}}^{x} tf(t)dt$ In the case of multiple servers the latency formula (3) described above is modified as $$T_r = T_s + \frac{P_n T_s(c_a^2 + c_s^2)}{2n(1-\rho)} G_{KLB},$$

Where n is the number of servers and $$P_n = \frac{(n\rho)^n}{n!(1-\rho)} \cdot \left[\sum_{k=0}^{n-1} \frac{(m\rho)^k}{k!} + \frac{(n\rho)^n}{n!(1-\rho)}\right]^{-1}.$$

It is noteworthy that $P_n$ is an estimation of the effective utilization in the system with n servers. The queuing system is not considered busy until all servers are busy. This is captured by expressing business as a function of the number of servers being utilized (one component in $P_n$ for each possible busy servers).

At each node resource there may be three traffic types: high priority, low priority and CP operations. The accuracy of the models depends how these three traffic types are interleaved to generate the final queuing model. If we assume the traffic at the storage module is managed according to priority levels of these types, the latency of high priority traffic, may be determined by [1]:

$$T_{r,1} = T_{s,1} + \frac{P_n}{2n(1-\rho)\rho} \sum_{i=1}^{N} \rho_i T_{s,i}(c_{a,i}^2 + c_{s,i}^2) G_{KLB}.$$

Here the summation is over N levels of priorities and the subscript i refers to parameters of that type of traffic. Note that i=1 refers to high priority traffic.

In another aspect, all types of traffic maybe combined into a single stream without any batching or priority assumptions. In that case the resulting variance when three types of traffic is mixed is given by:

$$\sigma_{mix}^2 = \frac{n_1}{n_1+n_2+n_3}(\sigma_1^2 + (\mu_{mix}-\mu_1)^2) + \frac{n_2}{n_1+n_2+n_3}(\sigma_2^2 + (\mu_{mix}-\mu_2)^2)\frac{n_3}{n_1+n_2+n_3}(\sigma_3^2 + (\mu_{mix}-\mu_3)^2),$$

where $n_i$ and $\mu_i$ are the sample size and the mean of each traffic type and $$\mu_{mix} = \frac{n_1}{n_1+n_2+n_3}\mu_1 + \frac{n_2}{n_1+n_2+n_3}\mu_2 + \frac{n_3}{n_1+n_2+n_3}\mu_3.$$

Once the variance and the mean of the inter-arrival times (or service times) the coefficient of variation associated with each process is computed and used within the GI/G/1 GI/G/n queuing formulas described above. If the variances are large and undesirable, the sample sizes $n_2$ and $n_3$, which correspond to low priority and CP traffic may be reduced by:

$$n_i = n_i \frac{n_i}{n_1+n_2+n_3}$$

Once the latency is determined using the foregoing models, in block B512, the LvU curve is augmented and the optimal point is determined.

In one aspect, the model based technique described above with respect to FIG. 5 has various advantages. The model based technique avoids the need for computational intensive curve extrapolation techniques, or complex methodologies. The model based technique provides a fast and efficient way to augment an incomplete LvU curve.

The system and processes described above provide an automated, machine based real time solution for efficiently track resource latency/utilization and manage available performance capacity. The techniques described herein are especially useful in today's distributed data centers where the storage servers have to constantly manage SLOs and client expectations. The ability to efficiently know performance capacity of resources is helpful for the storage operating systems to allocate I/O requests based on available headroom.

Figure 7:
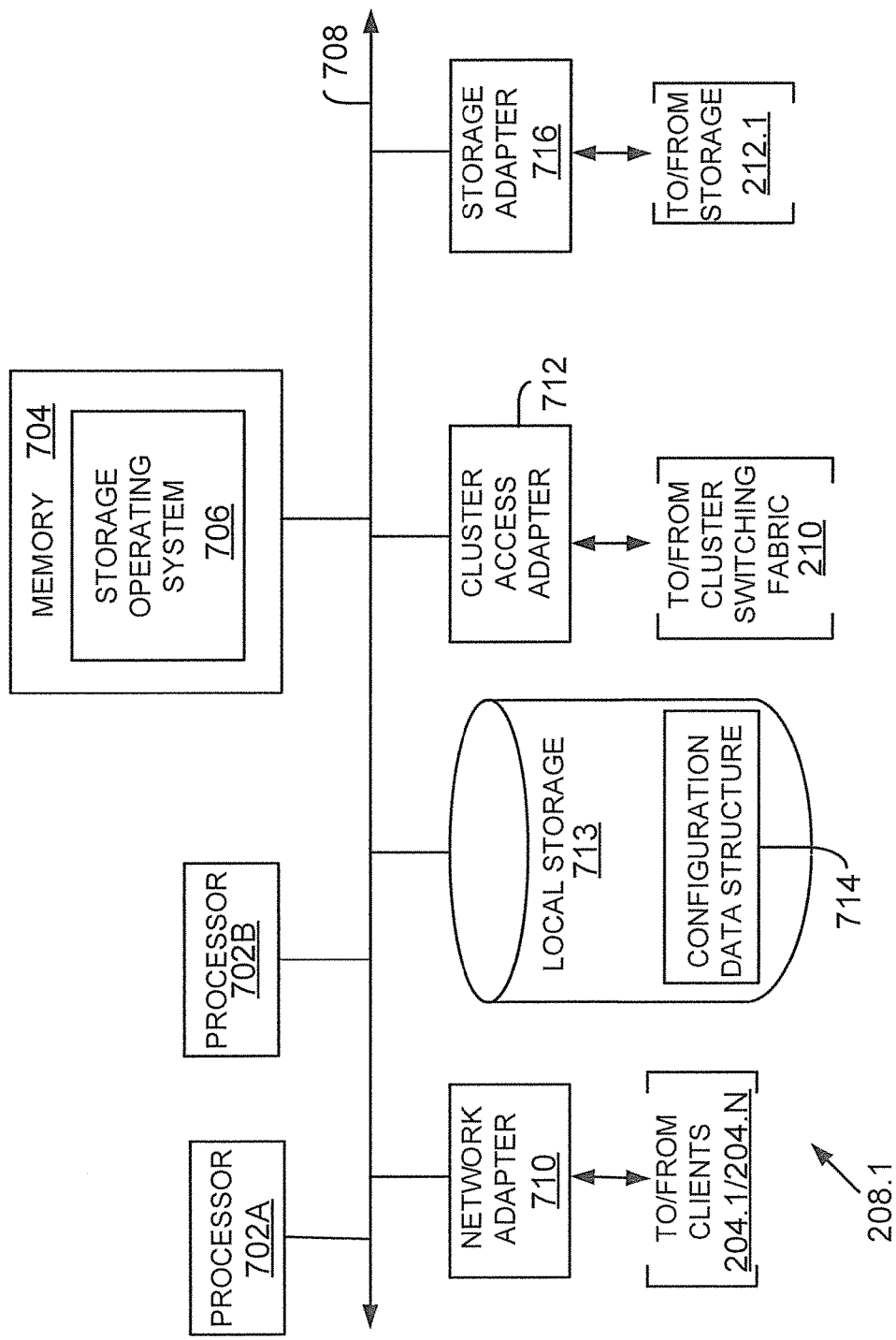
FIG. 7 shows an example of a storage system, used according to one aspect of the present disclosure.

Storage System Node:

FIG. 7 is a block diagram of a node 208.1 that is illustratively embodied as a storage system comprising of a plurality of processors 702A and 702B, a memory 704, a network adapter 710, a cluster access adapter 712, a storage adapter 716 and local storage 713 interconnected by a system bus 708. Node 208.1 is used as a resource and may be used to provide node and storage utilization information to headroom module 113 described above in detail.

Processors 702A-702B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. Idle time for processors 702A-702A is tracked by counters 306A, described above in detail.

The local storage 713 comprises one or more storage devices utilized by the node to locally store configuration information for example, in a configuration data structure 714. The configuration information may include information regarding storage volumes and the QOS associated with each storage volume.

The cluster access adapter 712 comprises a plurality of ports adapted to couple node 208.1 to other nodes of cluster 202. In the illustrative aspect, Ethernet may be used as the clustering protocol and interconnect media, although it will be apparent to those skilled in the art that other types of protocols and interconnects may be utilized within the cluster architecture described herein. In alternate aspects where the network modules and storage modules are implemented on separate storage systems or computers, the cluster access adapter 712 is utilized by the network/storage module for communicating with other network/storage-modules in the cluster 202.

Each node 208.1 is illustratively embodied as a dual processor storage system executing a storage operating system 706 (similar to 107, FIG. 1B) that preferably implements a high-level module, such as a file system, to logically organize the information as a hierarchical structure of named directories and files at storage 212.1. However, it will be apparent to those of ordinary skill in the art that the node 208.1 may alternatively comprise a single or more than two processor systems. Illustratively, one processor 702A executes the functions of the network module on the node, while the other processor 702B executes the functions of the storage module.

The memory 704 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein including the process blocks executed by headroom module 113.

The storage operating system 706 portions of which is typically resident in memory and executed by the processing elements, functionally organizes the node 208.1 by, inter alia, invoking storage operation in support of the storage service implemented by the node.

In one aspect, data that needs to be written is first stored at a buffer location of memory 704. Once the buffer is written, the storage operating system acknowledges the write request. The written data is moved to NVRAM storage and then stored persistently.

The network adapter 710 comprises a plurality of ports adapted to couple the node 208.1 to one or more clients 204.1/204.N over point-to-point links, wide area networks, virtual private networks implemented over a public network (Internet) or a shared local area network. The network adapter 710 thus may comprise the mechanical, electrical and signaling circuitry needed to connect the node to the network. Each client 204.1/204.N may communicate with the node over network 206 (FIG. 2A) by exchanging discrete frames or packets of data according to pre-defined protocols, such as TCP/IP.

The storage adapter 716 cooperates with the storage operating system 706 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored at storage device 212.1. The storage adapter 716 comprises a plurality of ports having input/output (I/O) interface circuitry that couples to the storage devices over an I/O interconnect arrangement, such as a conventional high-performance, Fibre Channel link topology.

Figure 8:
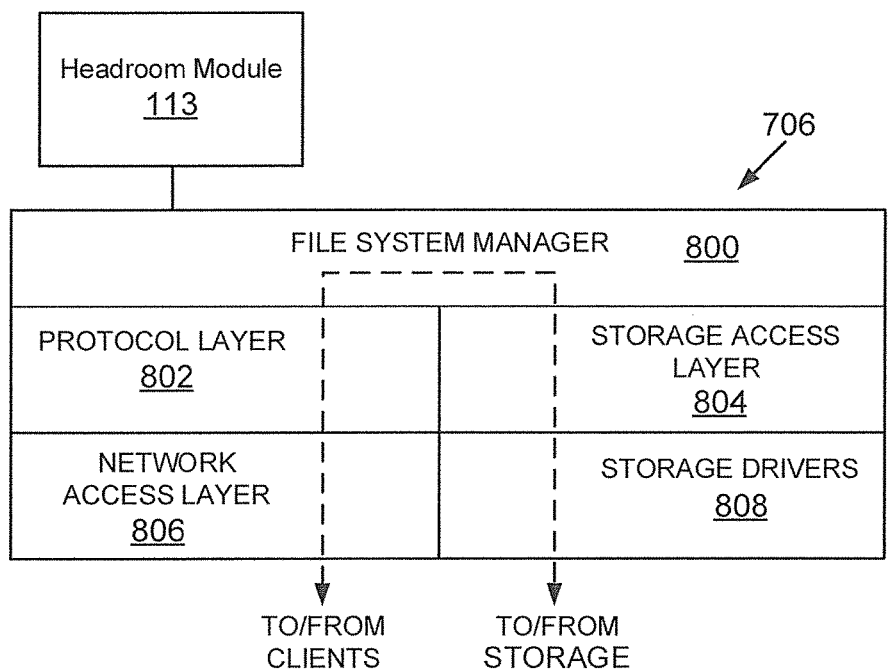
FIG. 8 shows an example of a storage operating system, used according to one aspect of the present disclosure.

Operating System:

FIG. 8 illustrates a generic example of storage operating system 706 (or 107, FIG. 1B) executed by node 208.1, according to one aspect of the present disclosure. The storage operating system 706 interfaces with the headroom module 113 for providing resource performance data. The storage operating system 706 may also maintain a plurality of counters for tracking node utilization and storage device utilization information. For example, counters 306A-306B and 316A-316C may be maintained by the storage operating system 706 and counter information is provided to the headroom module 113. In another aspect, headroom module 113 maintains the counters and they are updated based on information provided by the storage operating system 706.

In one example, storage operating system 706 may include several modules, or "layers" executed by one or both of network module 214 and storage module 216. These layers include a file system manager 800 that keeps track of a directory structure (hierarchy) of the data stored in storage devices and manages read/write operation, i.e. executes read/write operation on storage in response to client 204.1/204.N requests.

Storage operating system 706 may also include a protocol layer 802 and an associated network access layer 806, to allow node 208.1 to communicate over a network with other systems, such as clients 204.1/204.N. Protocol layer 802 may implement one or more of various higher-level network protocols, such as NFS, CIFS, Hypertext Transfer Protocol (HTTP), TCP/IP and others.

Network access layer 806 may include one or more drivers, which implement one or more lower-level protocols to communicate over the network, such as Ethernet. Interactions between clients' and mass storage devices 212.1-212.3 (or 114) are illustrated schematically as a path, which illustrates the flow of data through storage operating system 706.

The storage operating system 706 may also include a storage access layer 804 and an associated storage driver layer 808 to allow storage module 216 to communicate with a storage device. The storage access layer 804 may implement a higher-level storage protocol, such as RAID (redundant array of inexpensive disks), while the storage driver layer 808 may implement a lower-level storage device access protocol, such as Fibre Channel or SCSI. The storage driver layer 808 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 9:
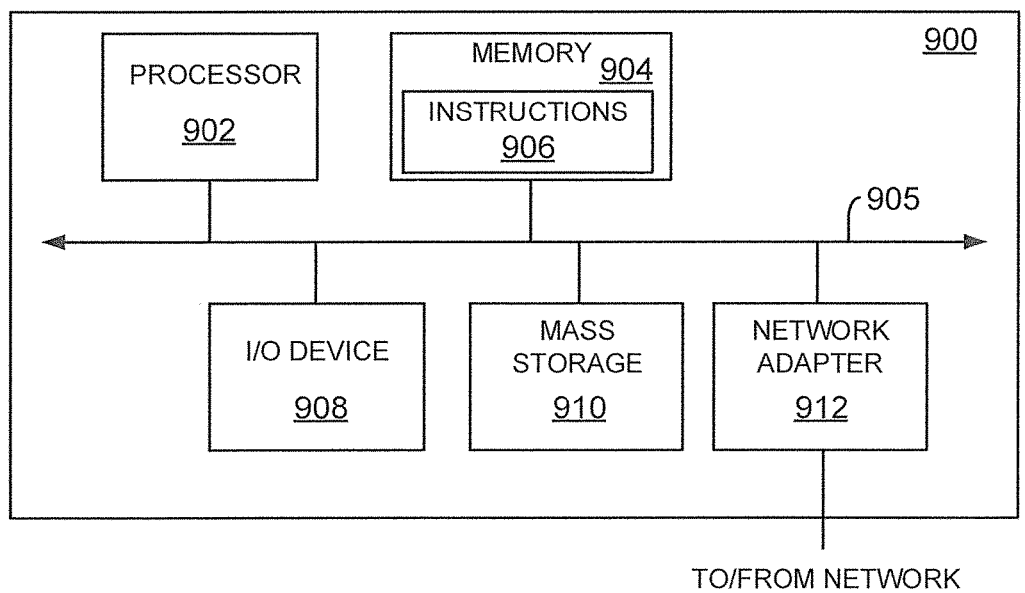
FIG. 9 shows an example of a processing system, used according to one aspect of the present disclosure.

Processing System:

FIG. 9 is a high-level block diagram showing an example of the architecture of a processing system 900 that may be used according to one aspect. The processing system 900 can represent performance manager 121, host system 102, management console 118, clients 116, 204, or storage system 108. Note that certain standard and well-known components which are not germane to the present aspects are not shown in FIG. 9.

The processing system 900 includes one or more processor(s) 902 and memory 904, coupled to a bus system 905. The bus system 905 shown in FIG. 9 is an abstraction that represents any one or more separate physical buses and/or point-to-point connections, connected by appropriate bridges, adapters and/or controllers. The bus system 905, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 902 are the central processing units (CPUs) of the processing system 900 and, thus, control its overall operation. In certain aspects, the processors 902 accomplish this by executing software stored in memory 904. A processor 902 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 904 represents any form of random access memory (RAM), read-only memory (ROM), flash memory, or the like, or a combination of such devices. Memory 904 includes the main memory of the processing system 900. Instructions 906 implement the process steps of FIGS. 4A and 5 and maintain data structure 215A as described above may reside in and executed by processors 902 from memory 904.

Also connected to the processors 902 through the bus system 905 are one or more internal mass storage devices 910, and a network adapter 912. Internal mass storage devices 910 may be, or may include any conventional medium for storing large volumes of data in a non-volatile manner, such as one or more magnetic or optical based disks. The network adapter 912 provides the processing system 900 with the ability to communicate with remote devices (e.g., storage servers) over a network and may be, for example, an Ethernet adapter, a Fibre Channel adapter, or the like.

The processing system 900 also includes one or more input/output (I/O) devices 908 coupled to the bus system 905. The I/O devices 908 may include, for example, a display device, a keyboard, a mouse, etc.

Cloud Computing:

The system and techniques described above are applicable and especially useful in the cloud computing environment where storage is presented and shared across different platforms. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The storage systems/performance manager described above can be a part of the server layer for providing storage services. Details regarding these layers are not germane to the inventive aspects.

Thus, methods and apparatus for managing resources in a storage environment have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
determining a workload mix by a processor, based on performance data associated with a resource used in a networked storage system for reading and writing data at a storage device in response to a plurality of requests, wherein the workload mix is determined by a service time in which the resource processes the plurality of requests of the workload mix, and a parameter indicating variability in the service time;
categorizing the workload mix by the processor, using an index value indicating a utilization range of the resource in processing the workload mix; and
determining by the processor, available performance capacity of the resource using the performance data for the categorized workload mix; wherein the available performance capacity is based on optimum utilization of the resource beyond which throughput gains for the workload mix is smaller than increase in latency, and utilization of the resource as indicated by the index value.

2. The machine implemented method of claim 1, wherein the resource is a processor for a networking module that provides networking functionality in the networked storage system and a processor for a storage module that interfaces with the storage device for storing data.

3. The machine implemented method of claim 1, wherein the resource is an aggregate that includes the storage device.

4. The machine implemented method of claim 1, wherein the performance data includes current latency and utilization data, inter-arrival time and service time for workloads processed by the resource.

5. The machine implemented method of claim 1, wherein in response to the performance data missing an index value, an index value of a neighboring workload mix with different service time but same indicia of variability is used to categorize the workload mix for determining the available performance capacity.

6. The machine implemented method of claim 1, wherein to determine the available performance capacity, a model based technique is used to augment an incomplete latency versus utilization relationship, the model based technique using service times and inter-arrival times at the resource for processing the plurality of requests for the workload mix.

7. The machine implemented method of claim 1, wherein a distribution coefficient is the parameter indicating variability of the service time.

8. A non-transitory, machine readable storage medium having stored thereon instructions for performing a method, comprising machine executable code which when executed by at least one machine, causes the machine to:
determine a workload mix, based on performance data associated with a resource used in a networked storage system for reading and writing data at a storage device in response to a plurality of requests, wherein the workload mix is determined by a service time in which the resource processes the plurality of requests of the workload mix, and a parameter indicating variability in the service time;
categorize the workload mix using an index value indicating a utilization range of the resource in processing the workload mix; and
determine available performance capacity of the resource using the performance data for the categorized workload mix; wherein the available performance capacity is based on optimum utilization of the resource beyond which throughput gains for the workload mix is smaller than increase in latency, and utilization of the resource as indicated by the index value.

9. The non-transitory, storage medium of claim 8, wherein the resource is a processor for a networking module that provides networking functionality in the networked storage system and a processor for a storage module that interfaces with the storage device for storing data.

10. The non-transitory, storage medium of claim 8, wherein the resource is an aggregate that includes the storage device.

11. The non-transitory, storage medium of claim 8, wherein the performance data includes current latency and utilization data, inter-arrival time and service time for workloads processed by the resource.

12. The non-transitory, storage medium of claim 8, wherein in response to the performance data missing an index value, an index value of a neighboring workload mix with different service time but same indicia of variability is used to categorize the workload mix for determining the available performance capacity.

13. The non-transitory, storage medium of claim 8, wherein to determine the available performance capacity, a model based technique is used to augment an incomplete latency versus utilization relationship, the model based technique using service times and inter-arrival times at the resource for processing the plurality of requests for the workload mix.

14. The non-transitory, storage medium of claim 8, wherein a distribution coefficient is the parameter indicating variability of the service time.

15. A system comprising:
a memory containing machine readable medium comprising machine executable code having stored thereon instructions; and a processor module coupled to the memory, the processor module executes the machine executable code to:
determine a workload mix, based on performance data associated with a resource used in a networked storage system for reading and writing data at a storage device in response to a plurality of requests, wherein the workload mix is determined by a service time in which the resource processes the plurality of requests of the workload mix, and a parameter indicating variability in the service time;
categorize the workload mix using an index value indicating a utilization range of the resource in processing the workload mix; and
determine available performance capacity of the resource using the performance data for the categorized workload mix; wherein the available performance capacity is based on optimum utilization of the resource beyond which throughput gains for the workload mix is smaller than increase in latency, and utilization of the resource as indicated by the index value.

16. The system of claim 15, wherein the resource is one of a processor for a networking module that provides networking functionality in the networked storage system, a processor for a storage module that interfaces with the storage device for storing data and an aggregate that includes the storage device.

17. The system of claim 15, wherein the performance data includes current latency and utilization data, inter-arrival time and service time for workloads processed by the resource.

18. The system of claim 15, wherein in response to the performance data missing an index value, an index value of a neighboring workload mix with different service time but same indicia of variability is used to categorize the workload mix for determining the available performance capacity.

19. The system of claim 15, wherein to determine the available performance capacity, a model based technique is used to augment an incomplete latency versus utilization relationship, the model based technique using service times and inter-arrival times at the resource for processing the plurality of requests for the workload mix.

20. The system of claim 15, wherein a distribution coefficient is the parameter indicating variability of the service time.

* * * * *